United States Patent [19]

Tomita et al.

[11] Patent Number: 4,739,670
[45] Date of Patent: Apr. 26, 1988

[54] BACKLASH REDUCER FOR GEAR TRANSMISSION SYSTEM

[75] Inventors: Takao Tomita, Niiza; Noriaki Kawai, Kamifukuoka; Katsura Shinoda, Niiza, all of Japan

[73] Assignee: Honda Giken Kogyo K.K., Tokyo, Japan

[21] Appl. No.: 872,280

[22] Filed: Jun. 9, 1986

[30] Foreign Application Priority Data

| | | | |
|---|---|---|---|
| Jun. 10, 1985 | [JP] | Japan | 60-125519 |
| Aug. 8, 1985 | [JP] | Japan | 60-174620 |
| Aug. 8, 1985 | [JP] | Japan | 60-174621 |
| Aug. 8, 1985 | [JP] | Japan | 60-174622 |
| Aug. 8, 1985 | [JP] | Japan | 60-174623 |
| Aug. 8, 1985 | [JP] | Japan | 60-174624 |
| Aug. 8, 1985 | [JP] | Japan | 60-174625 |
| Aug. 8, 1985 | [JP] | Japan | 60-174626 |
| Aug. 8, 1985 | [JP] | Japan | 60-174627 |
| Aug. 8, 1985 | [JP] | Japan | 60-121786[U] |
| Sep. 11, 1985 | [JP] | Japan | 60-201450 |
| Sep. 11, 1985 | [JP] | Japan | 60-201451 |

[51] Int. Cl.⁴ .................................... F16H 55/18
[52] U.S. Cl. .......................... 74/409; 74/440
[58] Field of Search ............ 74/409, 440, 444; 192/106.2

[56] References Cited

U.S. PATENT DOCUMENTS

| | | | |
|---|---|---|---|
| 1,317,232 | 9/1919 | Spillman | 74/440 |
| 1,334,517 | 3/1920 | Bryan | 74/440 |
| 1,748,820 | 2/1930 | Alexandrescu | 74/440 |
| 2,607,238 | 8/1952 | Enghish et al. | 74/440 |
| 3,487,706 | 1/1970 | Resener | 74/440 X |
| 3,648,534 | 3/1972 | Fagarazzi | 74/440 |
| 4,630,496 | 12/1986 | Yasuoka | 74/409 |

FOREIGN PATENT DOCUMENTS

| | | | |
|---|---|---|---|
| 3336669 | 4/1985 | Fed. Rep. of Germany | 74/409 |
| 31556 | 3/1981 | Japan | 74/409 |
| 26662 | 2/1984 | Japan | 74/409 |

OTHER PUBLICATIONS

*Product Engineering*, "18 Ways to Control Backlash in Gearing", pp. 71-75, Oct. 26, 1959.

*Primary Examiner*—Leslie Braun
*Assistant Examiner*—Dwight G. Diehl
*Attorney, Agent, or Firm*—Arthur L. Lessler

[57] ABSTRACT

A backlash reducer for a gear transmission system comprises a main gear and an auxiliary gear which form one of a driving gear and a driven gear in mesh therewith of the gear transmission system. The main gear is mounted on a rotary shaft for rotation therewith, and the auxiliary gear is mounted on the rotary shaft for rotation relative thereto. A backlash reducing mechanism is operable in response to a centrifugal force due to rotation of the rotary shaft for angularly moving the main and auxiliary gears relative to each other to reduce a backlash between the driving and driven gears. The backlash reducer may further comprise a mechanism for restraining the backlash reducing action of the backlash reducing mechanism. Alternatively, the backlash reducer may comprise a first mechanism operable in response to the centrifugal force to move the auxiliary gear axially thereof and a second mechanism for converting the axial movement of the auxiliary gear to circumferential movement thereof.

11 Claims, 25 Drawing Sheets

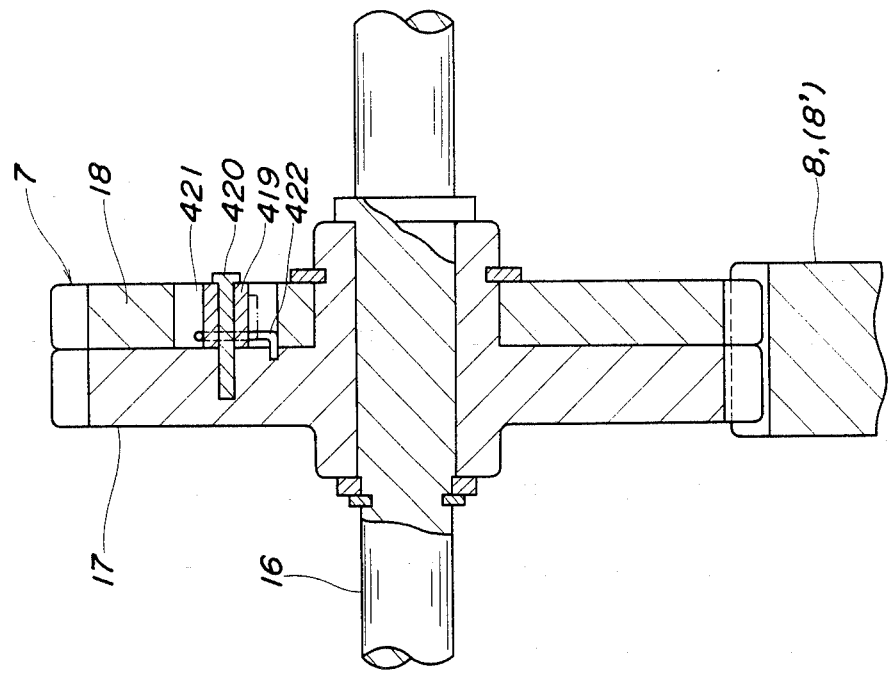
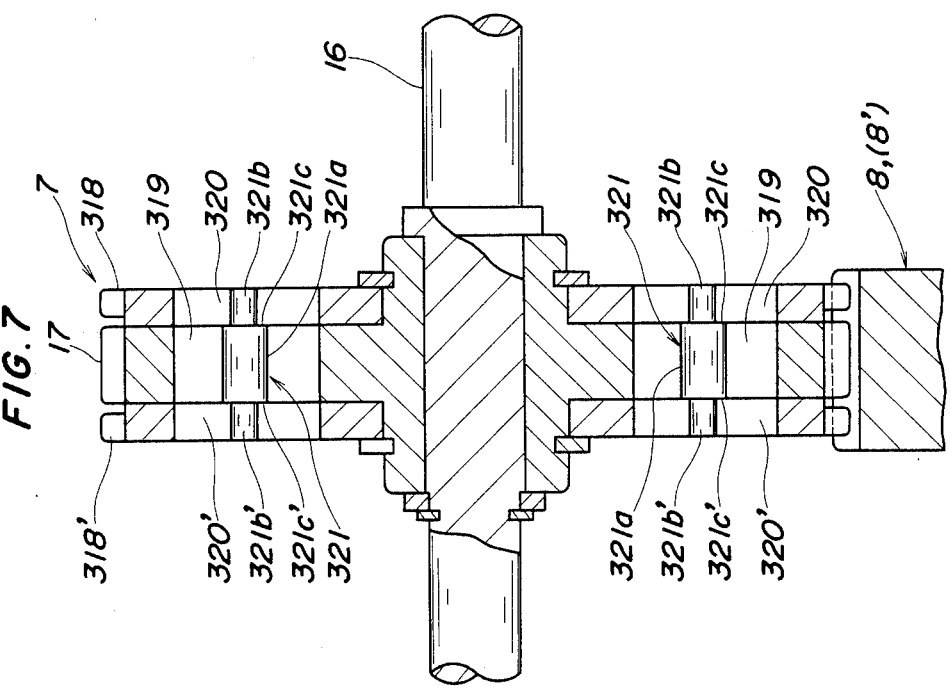

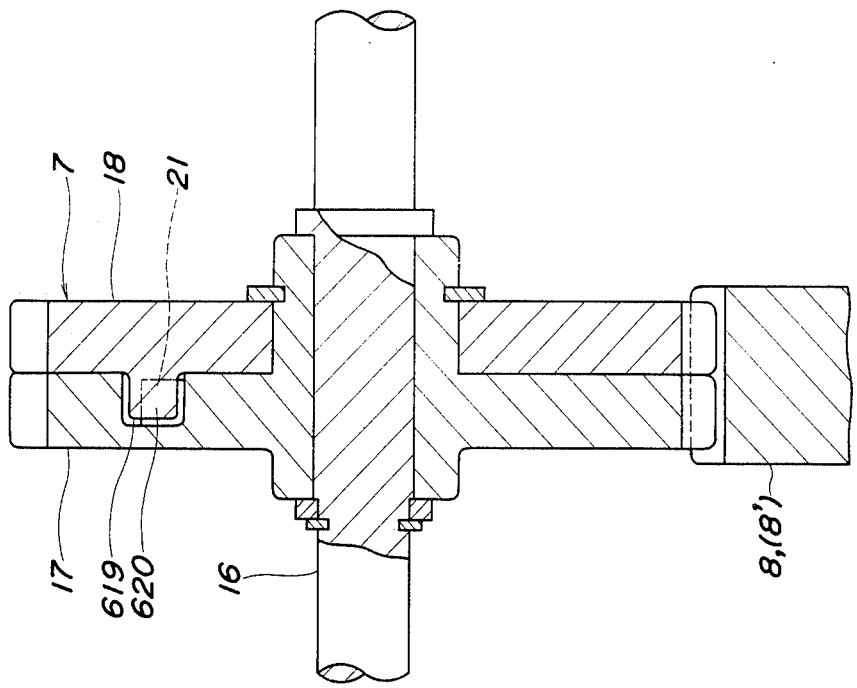
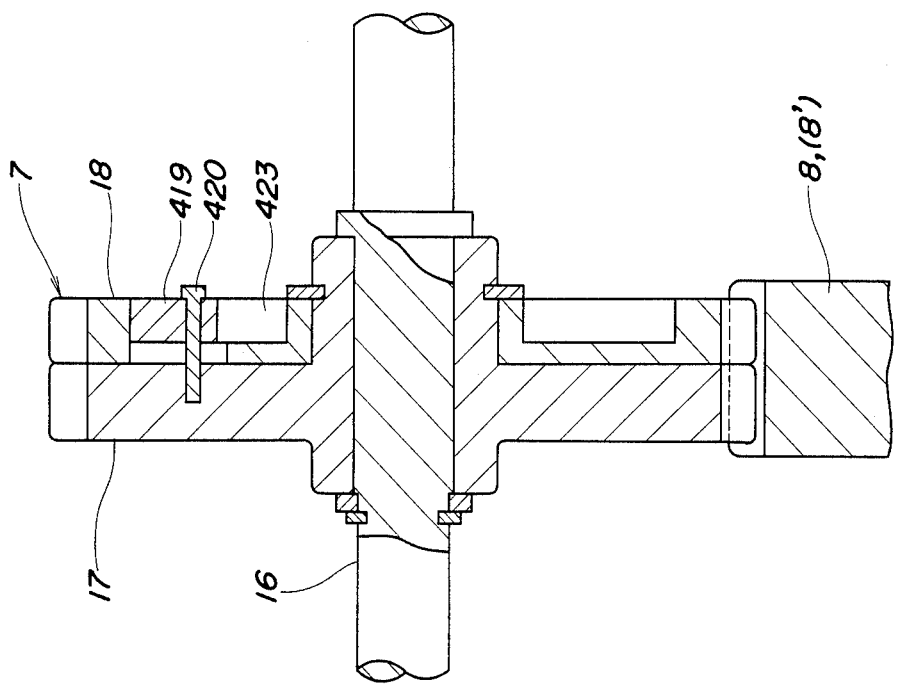

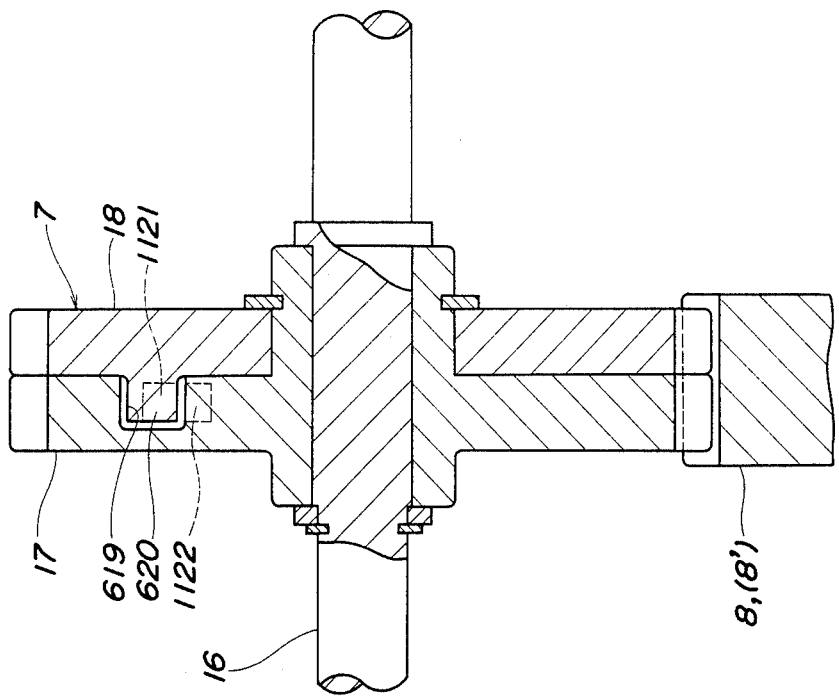
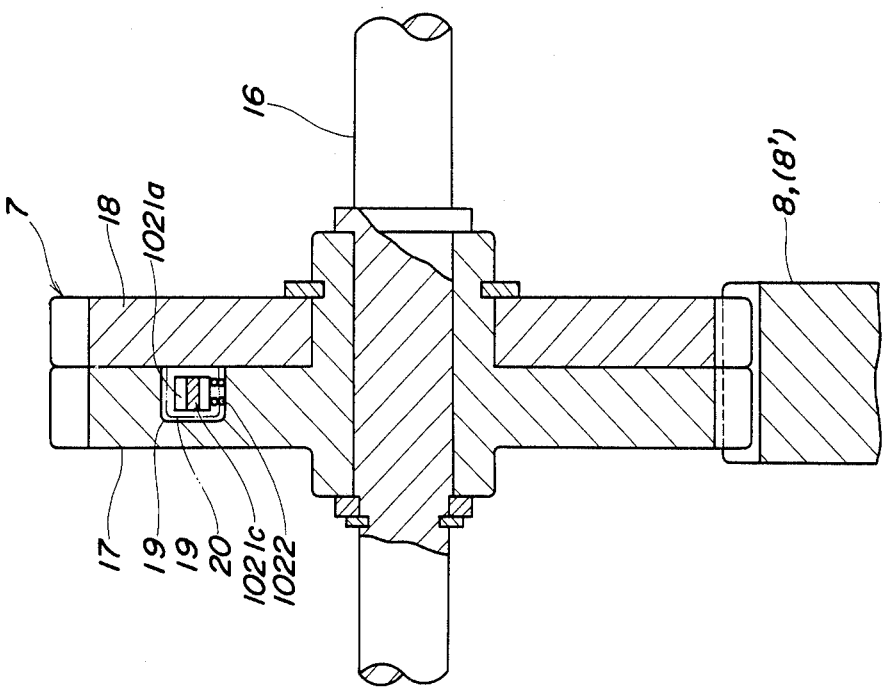

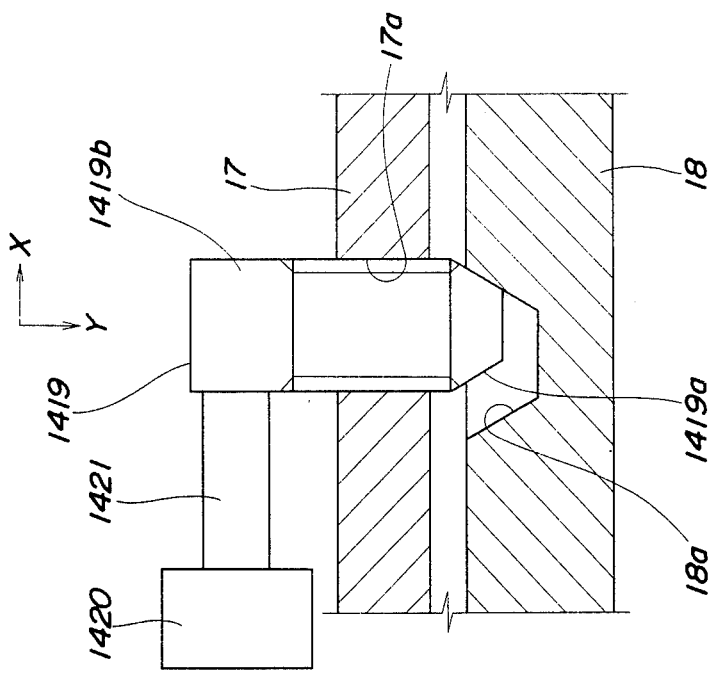
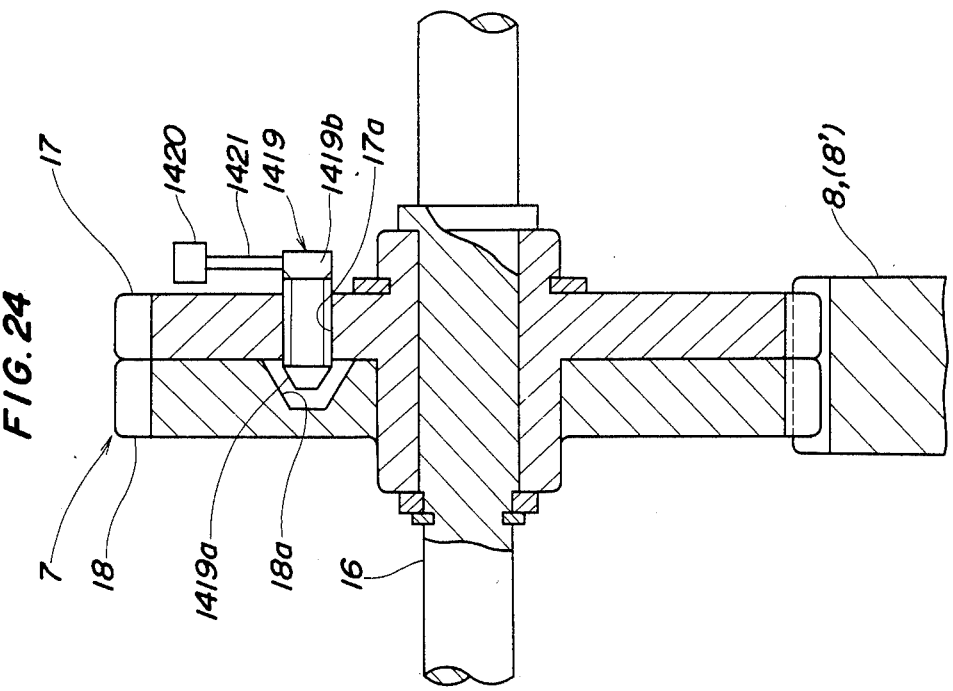

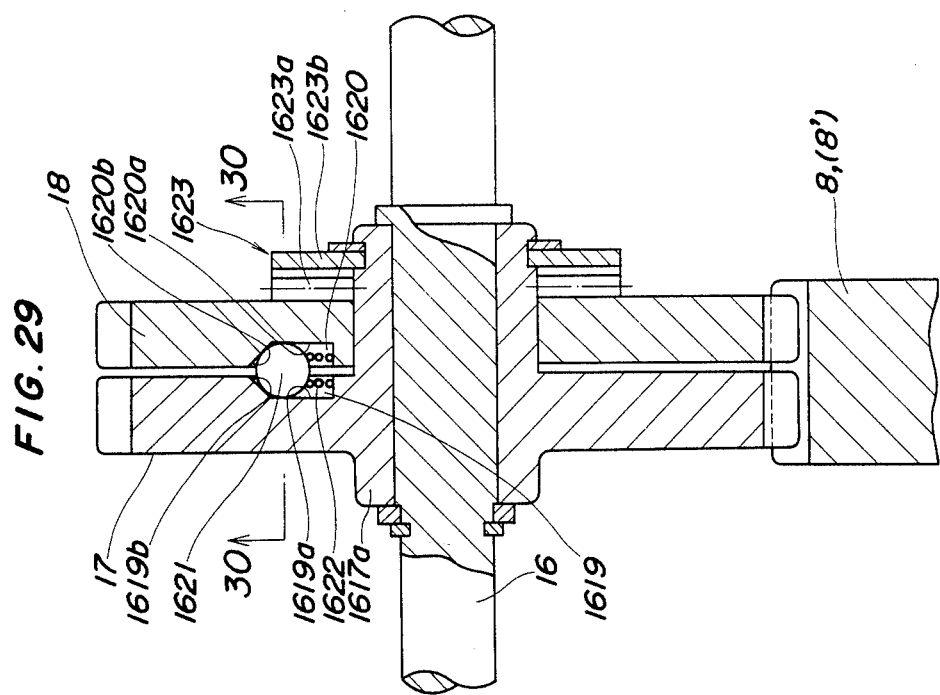
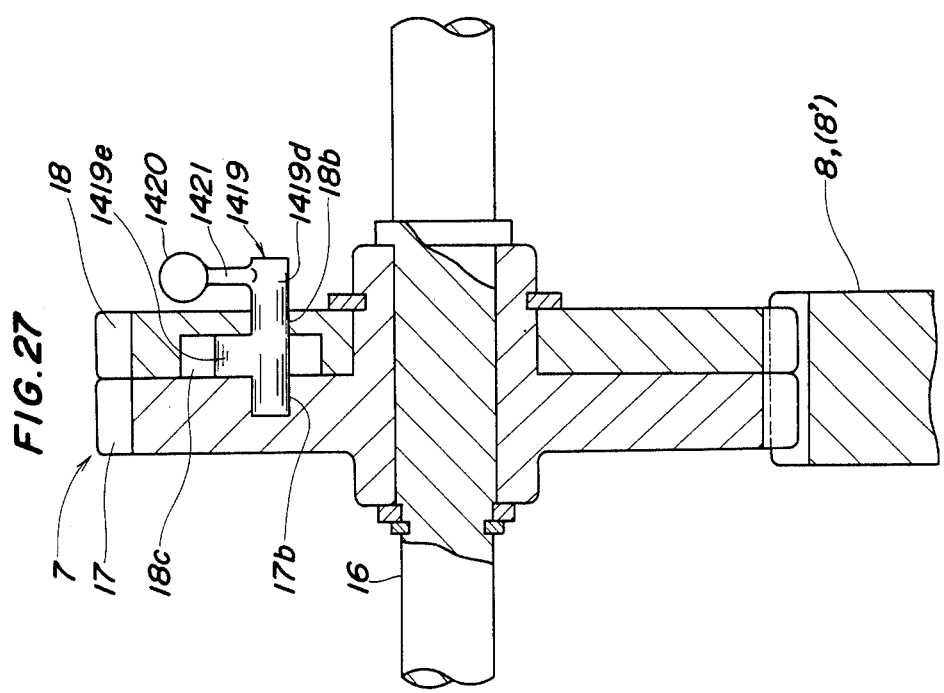

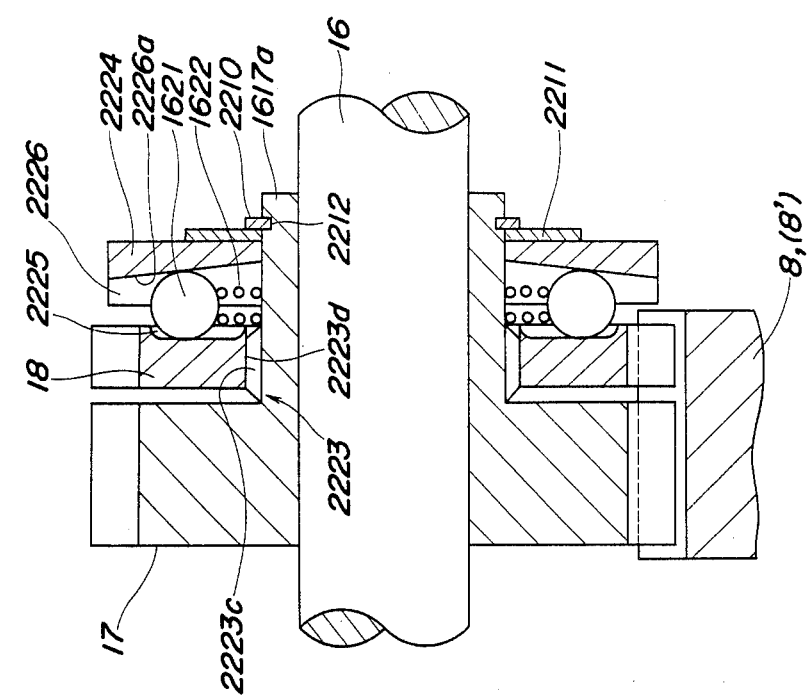
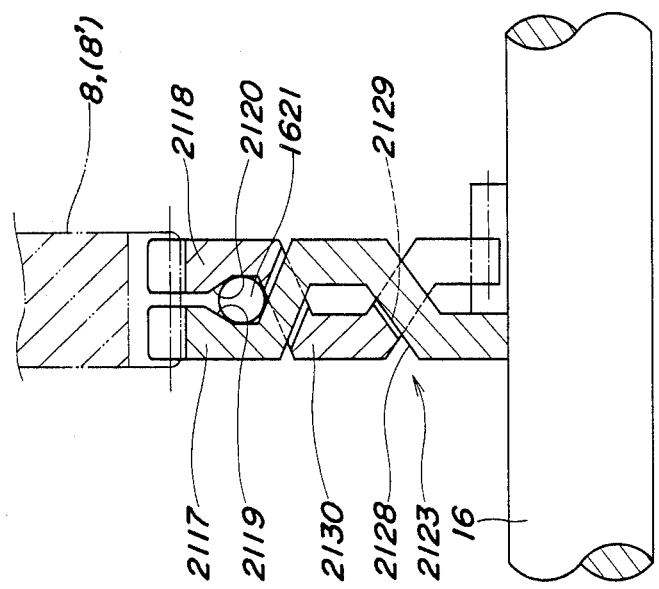

BACKLASH REDUCER FOR GEAR TRANSMISSION SYSTEM

BACKGROUND OF THE INVENTION

The present invention relates to a backlash reducer applicable to a gear transmission system such as a valve-operating-camshaft driving system for transmitting power from an internal combustion engine to a camshaft through a gear train, for example.

A gear transmission system in general such as the above-mentioned valve-operating-camshaft driving system for an internal combustion engine has the disadvantage that a backlash rapidly increases an impact load due to fluctuation in torque applied to the gears, resulting in an increase in knocking sound or chattering and a damage to the gears due to an abnormal load caused by the resulting resonance of the transmission system.

In order to solve the above-described problem, a backlash reducer has been proposed in which at least one of a driving gear and a driven gear in mesh therewith is constituted by a main gear mounted on a rotary shaft for rotation therewith and an auxiliary gear mounted on the rotary shaft in coaxial relation to the main gear for rotation relative thereto. Springs are disposed between the main and auxiliary gears for biasing same in such a direction that the main and auxiliary gears are angularly moved relative to each other. The main and auxiliary gears are brought into mesh with the mating gear in such a manner that a tooth of the mating gear is clamped between a tooth of the main gear and an adjacent tooth of the auxiliary gear with the adjacent teeth of the respective main and auxiliary gears being biased toward each other by the springs, to thereby redeuce the backlash and absorb the impact force.

However, when in particular the torque increases, the backlash reducing effect of such conventional backlash reducer would be lost if the force of the springs is relatively weak as compared with the increase in the torque. In order to avoid this, should the spring force be strengthened, meshing noise would be generated when the torque is relatively low.

Thus, it has been difficult to ensure reduction in backlash over the entire range from a low rotational speed to a high rotational speed of a gear transmission system in which fluctuation in torque is considerably high, such as a gear transmission system for use in an internal combustion engine.

SUMMARY OF THE INVENTION

It is the object of the present invention to provide a backlash reducer for a gear transmission system in which fluctuation in torque is considerably high, which backlash reducer can reduce a backlash over an entire range from a low rotational speed to a high rotational speed of gears and can ensure the prevention of meshing noise due to the reduction in the backlash.

According to the present invention, there is provided a backlash reducer for a gear transmission system including a driving gear, a driven gear in mesh therewith, and at least one rotary shaft having mounted thereon one of the driving and driven gears, the one gear mounted on the rotary shaft being constituted by a main gear mounted on the rotary shaft for rotation therewith and an auxiliary gear mounted on the rotary shaft in coaxial relation to the main gear for rotation relative to the main gear.

The backlash reducer is characterized by comprising: means disposed between the main and auxiliary gears and operable in response to a centrifugal force due to rotation of the rotary shaft for angularly moving the main and auxiliary gears relative to each other to reduce a backlash between the driving and driven gears.

Preferably, the means operable in response to the centrifugal force for angularly moving the main and auxiliary gears relative to each other to reduce the backlash comprises at least one first groove formed in an axial end face of the main gear opposite to the auxiliary gear, at least one second groove formed in an axial end face of the auxiliary gear opposite to the main gear in opposed relation to a corresponding one of the at least one first groove in the main gear, and at least one weight member slidably interposed between the opposed grooves, at least one of the opposed first and second grooves having a longitudinal axis inclined with respect to a line passing through a longitudinal center of the at least one groove and a rotational axis of the gear having formed therein the at least one groove in a manner such that an angle of the inclination of the longitudinal axis progressively varies as the longitudinal axis approaches an outer periphery of the gear having formed therein the at least one gear.

Further, preferably, the backlash reducer comprises: the auxiliary gear being constituted by a pair of first and second gears supported with the main gear being clamped therebetween; at least one first groove formed in the main gear so as to extend through a wall thereof; at least one second groove formed in an axial end face of each of the first and second gears opposite to the main gear in opposed relation to a corresponding one of the at least one first groove in the main gear and having a width less than that of the corresponding one groove in the main gear; and at least one weight member having opposite end portions and an intermediate portion therebetween, the opposite end portions having a diameter less than that of the intermediate portion, the opposite end portions being slidably fitted respectively in corresponding ones of the first and second grooves in the respective first and second gears, and the intermediate portion being slidably fitted in the corresponding one first groove in the main gear, wherein a centrifugal force due to rotation of the rotary shaft causes the at least one weight member to angularly move the main and auxiliary gears relative to each other.

According to another aspect of the invention, the backlash reducer comprises: at least one cam member pivotally mounted on an axial end face of the main gear opposite to the auxiliary gear; and an engaging surface provided on the auxiliary gear, the cam member having a cam surface engageable with the engaging surface, wherein a centrifugal force due to rotation of the rotary shaft causes the cam member to be pivotally moved to urge the cam surface thereof against the engaging surface, to thereby angularly move the main and auxiliary gears relative to each other.

Preferably, the backlash reducer includes: a bore formed through a wall of the auxiliary gear, the cam member being disposed within the bore, the bore having the engaging surface with which the cam surface of the cam member is engageable; and a spring interposed between the cam member and a wall surface of the bore for biasing the cam member in such a direction as to cause the cam surface of the cam member to be urged against the engaging surface; herein the centrifugal force due to the rotation of the main and auxiliary gears causes the cam member to be pivotally moved to urge the cam surface thereof against the engaging surface, to thereby angularly move the main and auxiliary gears relative to each other.

According to a further aspect of the invention, the backlash reducer includes: at least one pair of opposed clamping surfaces, one of the clamping surfaces being provided on the main gear and the other clamping surface being provided on the auxiliary gear; at least one weight member movably clamped between corresponding ones of the one and other clamping surfaces; and the one and other clamping surfaces being inclined with respect to a plane including an axis of the rotary shaft, wherein a centrifugal force due to rotation of the main and auxiliary gears causes the at least one weight member to angularly move the main and auxiliary gears relative to each other through the corresponding ones of the one and other clamping surfaces.

Preferably, the one and other clamping surfaces are inclined with respect to the plane at respective angles different from each other.

According to a still further aspect of the invention, the backlash reducer comprises: first means disposed between the main and auxiliary gears and operable in response to a centrifugal force due to rotation of the rotary shaft for angularly moving the main and auxiliary gears relative to each other to reduce a backlash between the driving and driven gears; and second means for restraining the backlash reducing action by the first means.

According to another aspect of the invention, the backlash reducer comprises: at least one backlash reducing member disposed between the main and auxiliary gears for angular movement around an axis extending parallel to an axis of the rotary shaft, the angular movement of the backlash reducing member causing the main and auxiliary gears to be angularly moved relative to each other to reduce a backlash between the driving and driven gears; at least one weight member; and at least one lever having one end thereof having the weight member mounted thereon and the other end connected to the backlash reducing member, wherein a centrifugal force due to rotation of the rotary shaft causes the at least one backlash reducing member to be angularly moved together with a respective one of the at least one lever in such a direction as to reduce the backlash.

According to a still further aspect of the invention, the backlash reducer comprises: the auxiliary gear being mounted on said rotary shaft for movement axially thereof; first means operable in response to a centrifugal force due to rotation of the rotary shaft to move the auxiliary gear axially thereof; and second means for converting the axial movement of the auxiliary gear to circumferential movement thereof, wherein the first and second means are operable in response to the centrifugal force due to the rotation of the main and auxiliary gears to angularly move the auxiliary gear relative to the main gear.

Preferably, the backlash reducer includes: a retainer plate removably mounted on the main gear; the first means for moving the auxiliary gear axially thereof being disposed between the retainer plate and the auxiliary gear.

Further, preferably, the backlash reducer includes: the second means being disposed between axial end faces of the main and auxiliary gears which are opposed to each other; third means for biasing the auxiliary gear axially toward the main gear; and fourth means for prohibiting the auxiliary gear from being axially moved by the first means against the third means.

The above and other objects, features and advantages of the invention will become more apparent from the ensuing detailed description taken in conjunction with the accompanying drawings.

BRIEF DESCRIPTION OF THE DRAWINGS

FIG. 7 is a cross-dectional view taken along the line 7—7 in FIG. 6;

FIG. 9 is a cross-sectional view taken along the line 9—9 in FIG. 8;

FIG. 11 is a cross-sectional view taken along the line 11—11 in FIG. 10;

FIG. 13 is a view taken along the line 13—13 in FIG. 12;

FIG. 18 is a cross-sectional view taken along the line 18—18 in FIG. 17;

FIG. 20 is a cross-sectional view taken along the line 20—20 in FIG. 19;

FIG. 24 is a cross-sectional view taken along the line 24—24 in FIG. 23;

FIG. 25 is a cross-sectional view taken along the line 25—25 in FIG. 23;

FIG. 27 is a cross-sectional view taken along the line 27—27 in FIG. 26;

FIG. 29 is a cross-sectional view taken along the line 29—29 in FIG. 28;

FIG. 35 is a view similar to FIG. 31, but showing a twentieth embodiment of the invention;

FIG. 36 is a view similar to FIG. 31, but showing a twenty-first embodiment of the invention;

DETAILED DESCRIPTION

Various embodiments of the invention will be described with reference to the drawings.

Figure 1:
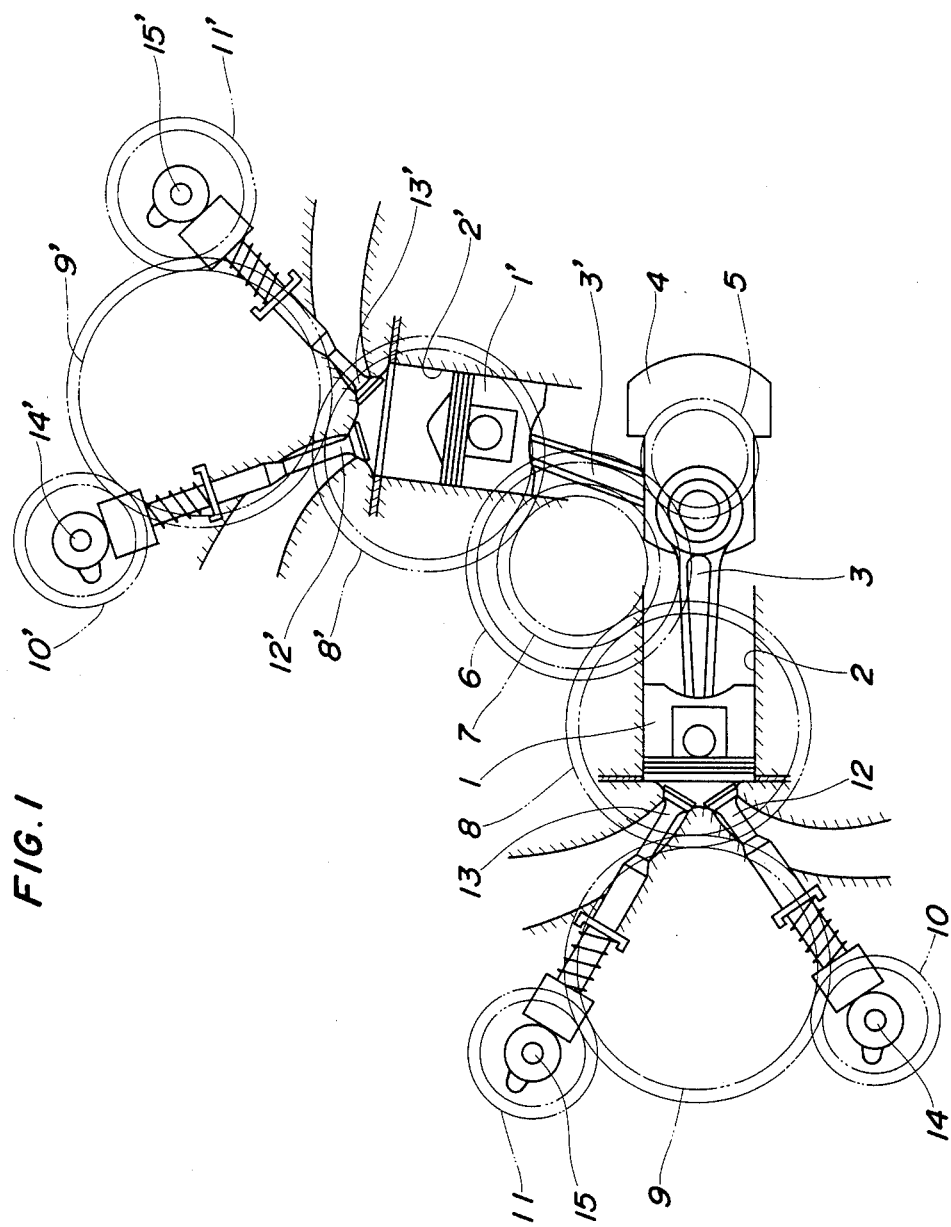
FIG. 1 is a diagrammatically fragmentary, cross-sectional view showing a valve-operating-camshaft driving system of a V-type multi-cylinder engine, which has incorporated thereinto a backlash reducer in accordance with the invention.

FIG. 1 is a side elevational view showing a valve-operating-camshaft driving system of a V-type multi-cylinder engine, to which is applicable a backlash reducer in accordance with the invention. Pistons 1 and 1' slidably received in their respective cylinders 2 and 2' are connected to a crankshaft 4 through respective connecting rods 3 and 3' so that the crankshaft 4 is rotated by the reciprocating motion of the pistons 1 and 1'. The rotation of the crankshaft 4 is transmitted to an intake valve 12, 12' and an exhaust valve 13, 13' of each cylinder 2, 2' through a crankshaft gear 5, a driven idle gear 6 in mesh with the crankshaft gear 5, a driving idle gear 7 mounted in coaxial relation to the driven idle gear 6 for rotation therewith, a corresponding intermediate idle gear 8, 8' in mesh with the driving idle gear 7, a corresponding last-stage idle gear 9, 9' in mesh with the intermediate idle gear 8, 8', and respective cam gears 10 and 11, 10' and 11' in mesh with the last-stage idle gear 9, 9'. Although the backlash reducer of the invention is applicable to any pair of intermeshing gears of such valve-operating-camshaft driving system, first to twenty-second embodiments of the invention will be described as being applied to a pair of driving idle gear 7 and intermediate idle gear 8, 8'.

The backlash reducer in accordance with the first to ninth embodiments, which is operable in response to a centrifugal force due to rotation of the driving idle gear 7, will be first described.

Figure 2:
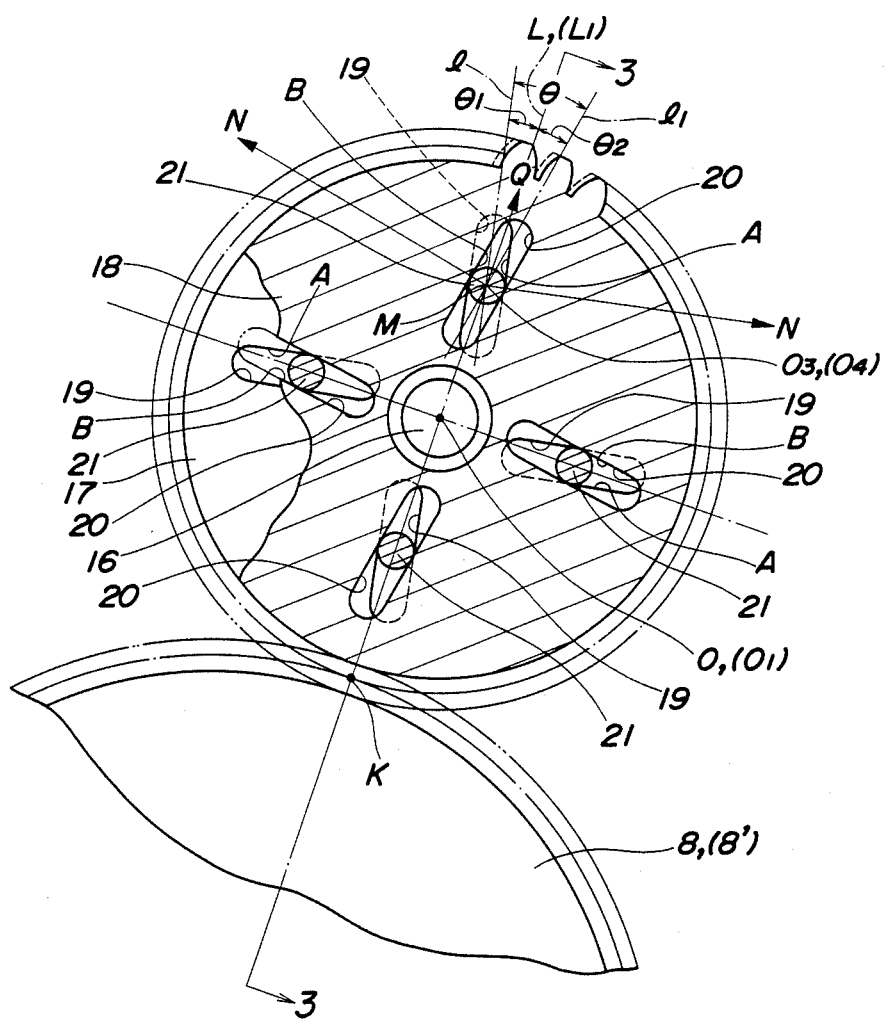
FIG. 2 is a partially broken-away, fragmentary enlarged side elevational view showing an essential part of a first embodiment of the invention.
Figure 3:
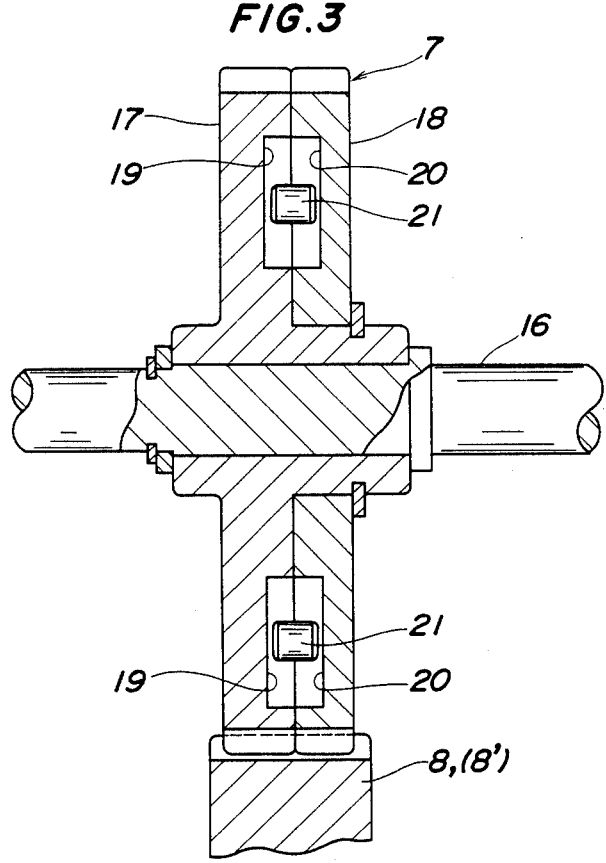
FIG. 3 is a cross-sectional view taken along the line 3—3 in FIG. 2.

FIGS. 2 and 3 show a backlash reducer in accordance with a first embodiment of the invention. The driving idle gear 7 is constituted by a main gear 17 mounted on a rotary shaft 16 for rotation therewith and an auxiliary gear 18 mounted on the rotary shaft 16 for rotation relative to the main gear 17. The main and auxiliary gears 17 and 18 are in mesh with the intermediate idle gears 8 and 8' with axial end faces of the respective gears 17 and 18 opposite to each other being brought into sliding contact with each other. The axial end face of the main gear 17 opposite to the auxiliary gear 18 has formed therein a plurality of (four, for example) elongated grooves 19 circumferentially equidistantly spaced from each other. The grooves 19 are oriented such that a major or longitudinal axis l of each groove 19 is inclined in the same direction at an angle $\theta_1$ to a line L passing through a longitudinal center $O_3$ of the groove 19 and a center or axis O of the main gear 17 with respect to a point M on the line L. Arranged opposite the respective grooves 19 of the main gear 17 are the same number of grooves 20 formed in the axial end face or the auxiliary gear 18 opposite to the main gear 17 and circumferentially equidistantly spaced from each other. The grooves 20 of the auxiliary gear 18 are the same in configuration and dimensions as the grooves 19 of the main gear 17, and a longitudinal center $O_4$ of each groove 18 is coincident with the center $O_3$ of the corresponding groove 19. In addition, the grooves 20 are oriented such that a major or longitudinal axis $l_1$ of each groove 20 is inclined in the same direction at an angle $\theta_2$ to a line $L_1$ passing through the center $O_4$ of the groove 20 and a center or axis $O_1$ of the auxiliary gear 19 with respect to the point M on the line $L_1$. However, the circumferential direction of inclination of the grooves 20 is reverse to that of the grooves 19.

One of opposite lateral side surfaces of each groove 19 forms a clamping surface A, and one of opposite lateral side surfaces of the corresponding groove 20 forms a clamping surface B which is opposed to the clamping surface A to cooperate therewith. The relationship between the angles $\theta_1$ and $\theta_2$ is not limited to a $\theta_1 \approx \theta_2$, but may be $\theta_1 = \theta_2$ or $\theta_1 \neq \theta_2$.

Each of weight members 21 is slidably received in and between corresponding one of pairs of opposed grooves 19 and 20 in the respective main and auxiliary gears 17 and 18. The weight member 21 is in the form of a roller having a circular cross-section, but may be in the form of a sphere or a block. The weight members 21 are moved radially outwardly under a centrifugal force due to rotation of the gears 17 and 18. Radial movement of the weight member 21 causes the gears 17 and 18 to be angularly moved relative to each other so that an angularly moving force dependent upon the rotational speed being applied to the gears 17 and 18.

Figure 4:
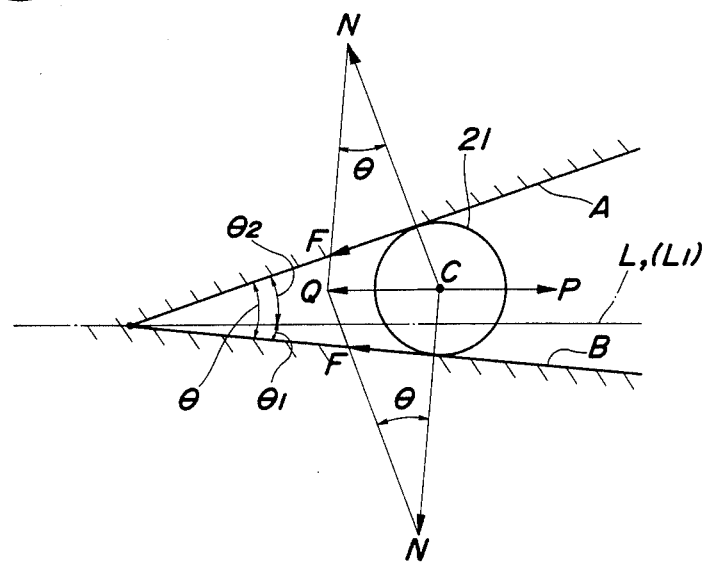
FIG. 4 is a diagrammatical view for explanation of the operation of the first embodiment.

The operation or function of the backlash reducer for the gear transmission system constructed as above in accordance with the first embodiment will be described with reference to FIG. 4. The rotational power of the main and auxiliary gears 17 and 18 which constitute the driving idle gear 7 is transmitted to the intermediate idle gears 8 and 8' through respective meshing points K between the intermediate idle gears 8 and 8' and the main gear 17. Here, a case will be considered where a backlash is present at the meshing point K between the main gear 17 and the intermediate idle gear 8, 8'. The gears 17 and 18 are oscillated between a pair of adjacent gear teeth of the intermediate idle gear 8, 8' due to fluctuations in torque during rotation of the gears 17 and 18. As a result, a circumferential spacing between each pair of opposed clamping surfaces A and B is repeatedly enlarged and reduced. Upon enlargement of the circumferential spacing, the weight member 21 is bitten into or clamped between the clamping surfaces A and B by the centrifugal force Q generated due to the rotation of the rotary shaft 16. That is, the centrifugal force Q principally acts to cause the weight member 21 to be moved in such a direction as to minimize the backlash. Furthermore, the coefficient of friction of the clamping surfaces A and B is determined such that the weight member 21 clamped between the corresponding pair of clamping surfaces A and B is held substantially in a position by the balance between a force P tending to expel the weight member 21 radially inwardly along the line L, $L_1$ in dependence upon an angle $\theta$ ($=\theta_1+\theta_2$) defined between the clamping surfaces A and B (the expelling force P is due to the action and reaction to and from the clamping surfaces A and B and is distributed depending upon the clamping angle $\theta$), forces N developed by normal or perpendicular drags acting upon the weight member 21 in the circumferential direction of the gears, and frictional forces F ($=\mu N$, where $\mu$: coefficient of friction) between the weight member 21 and the clamping surfaces A and B. The above-mentioned expelling force P satisfies the relationship $P \approx N \tan \theta$. Thus, as the rotation of the gears shifts to a high rotational speed range, the centrifugal force Q on the weight member 21 is increased to further increase the force tending to hold the wieght member 21 between the clamping surfaces A and B against the force P. Accordingly, the above-mentioned forces on the weight member 21 are balanced against the fluctuation in torque at a position where the backlash is minimized. Thus, it is possible to reduce meshing noise resulting from the backlash, over the entire rotational speed range from a low rotational speed to a high rotational speed.

What is important here is that the balancing conditions of the weight member 21 are as follows, and therefore the clamping angle $\theta$ is independent of the normal drags N the clamping surfaces A and B but is a function of given by the coefficient of friction alone:

$P \approx 2F$ $N \tan \theta \approx 2 \mu N$ $\theta \approx \tan^{-1} 2\mu$

Accordingly, if the coefficient of friction $\mu$ and the clamping angle $\theta$ are set such that the expelling force P becomes nearly zero, it is possible to obtain a great torque transmitting force and minimize impact load due to the backlash, merely with a small force resulting from the centrifugal force Q, provided that the above-mentioned balancing conditions are satisfied.

Besides, since the centrifugal force Q is in proportion to the second power or square of the rotational speed, if the clamping angle $\theta$ and the coefficient of friction $\mu$ are set such that the balancing conditions are satisfied in the vicinity of the engine idling, it is possible to reduce the backlash with a greater centrifugal force increasing with an increase in the rotational speed. Moreover, when an engine casing and the like having been thermally expanded are contracted after engine loaded operation, the backlash between the intermeshing gear teeth is reduced and the weight member 21 tends to be returned toward its original position. Such tendency is presumed to occur under an engine idling condition lasting for a long period of time after heavily loaded operation of the engine or under an engine stop condition after the heavily loaded operation, i.e., within a range in which the centrifugal force Q is low. Under such conditions, the weight member 21 is easily allowed to move back, and an adequate load is applied to the intermeshing gear teeth without occurrence of excessive tooth flank load even at a restart-up of the engine, to thereby ensure no backlash.

A decrease in the centrifugal force due to a change in the rotational speed from a high speed range to a low speed range causes each weight member 21 to be moved in response to a corresponding change in the load from the associated pair of opposed clamping surfaces A and B, between them toward the centers O and $O_1$ of the respective main and auxiliary gears 17 and 18. However, since the clamping surfaces A and B are inclined at the respective angles $\theta_1$ and $\theta_2$ to the line L, a wedge action occurs so that a resistance force is developed against the return movement of the weight member 21 by the dynamic balance between the frictional force between the clamping surfaces A and B and the weight member 21 and the angles of inclination $\theta_1$ and $\theta_2$. This permits the main and auxiliary gears 17 and 18 to be gradually returned to their original positions. Thus, the angularly moving force is not reduced rapidly.

Figure 5:
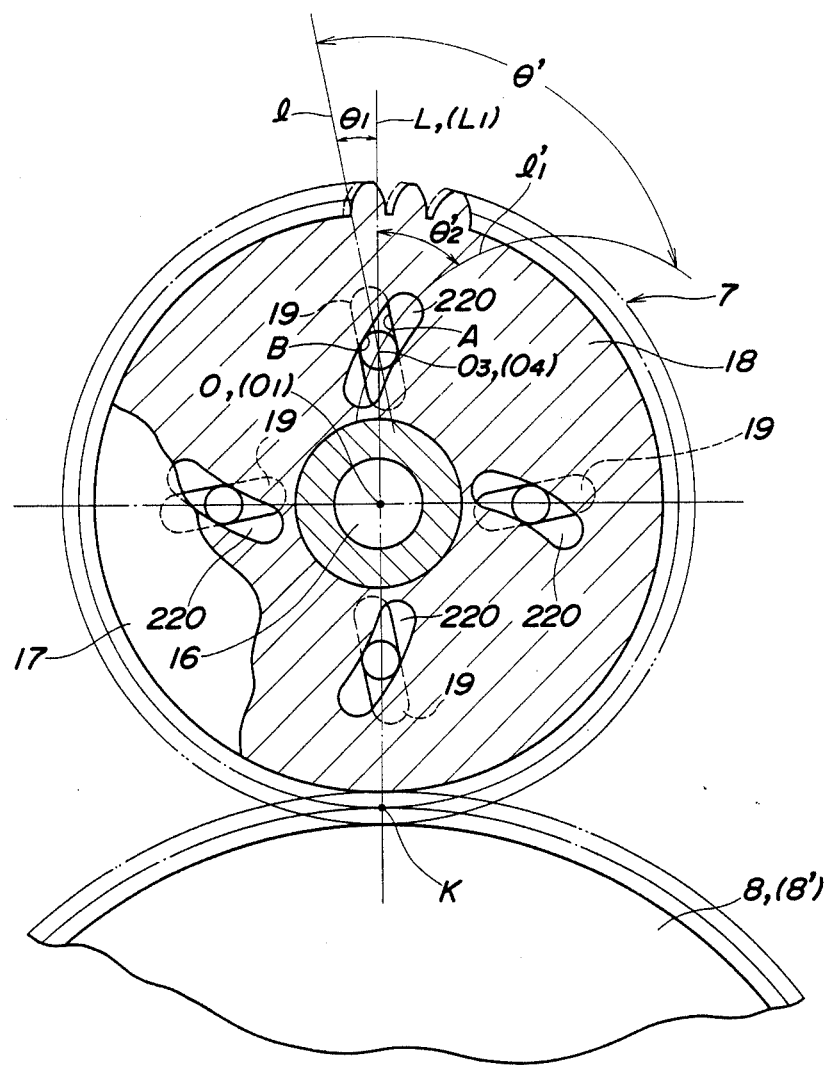
FIG. 5 is a view similar to FIG. 2, but showing a second embodiment of the invention.

FIG. 5 shows a second embodiment of the invention. In FIG. 5, like reference characters are used to designate like or similar parts and components to those of the first embodient shown in FIGS. 2 and 3, and the description of such similar parts and components is therefore omitted.

The second embodiment is different from the above-described first embodiment in the configuration of elongated grooves 220 formed in the auxiliary gear 18. Specifically, each of the grooves 220 is arcuate, and has a longitudinal center $O_4$ coincident with a longitudinal center $O_3$ of corresponding one of grooves 19 in the main gear 17. In addition, the grooves 220 are oriented such that a major or longitudinal axis $l_1$ of each groove 220 is inclined in the same direction at an angle $\theta'_2$ to the line $L_1$ passing through the center $O_4$ of the groove 220 and the center $O_1$ of the auxiliary gear 18, with the angle $\theta'_2$ increasing progressively as the major axis $l_1$ approaches the outer periphery of the gear 18. Accordingly, as the amount of relative angular deviation between the main and auxiliary gears 17 and 18 increases, a rate of change in a clamping angle $\theta'$ ($=\theta_1+\theta'_2$) between the major axis l of the groove 19 in the main gear 17 and the major axis $l_1$ of the groove 220 in the auxiliary gear 18 increases. The backlash reducing action due to the centrifugal force Q is enhanced in a multiplied manner in accordance with the increase in the rate of change.

Figure 6:
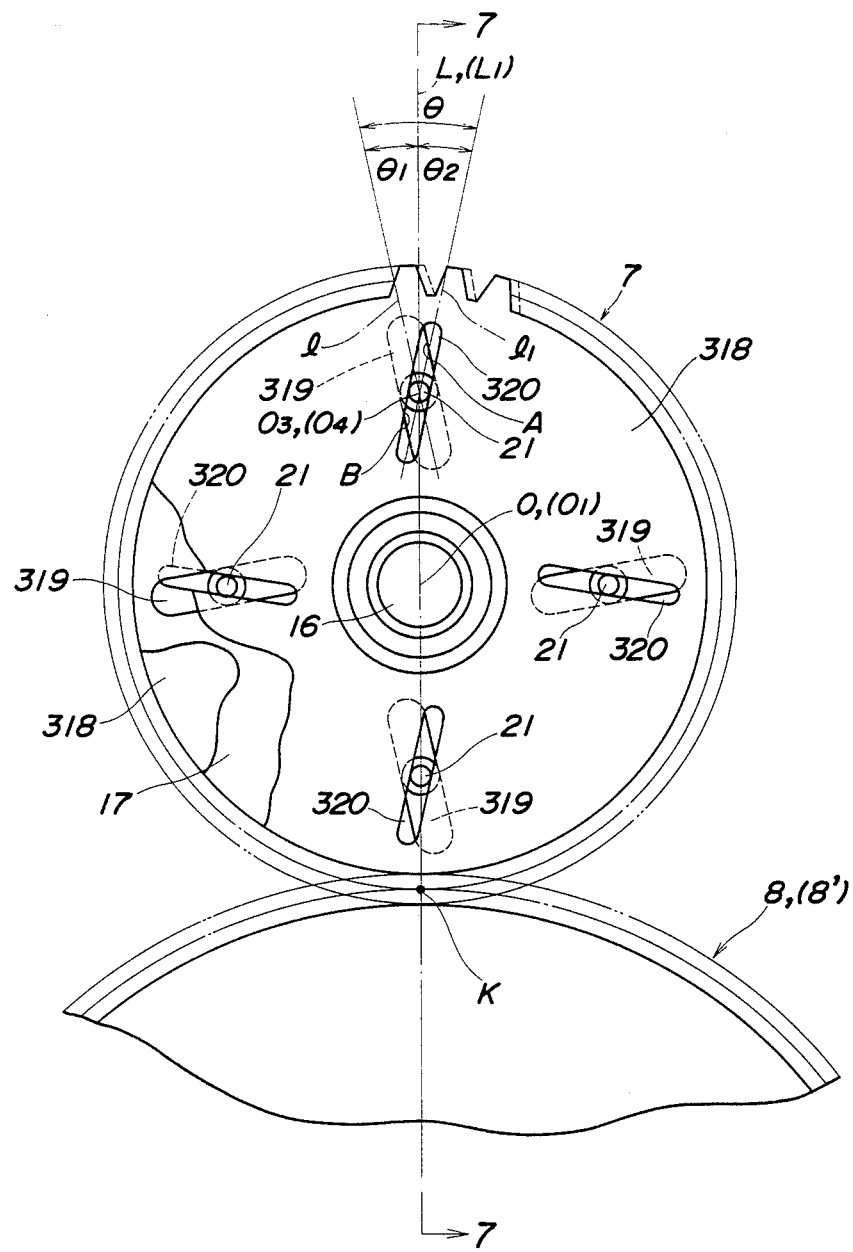
FIG. 6 is a view similar to FIG. 2, but showing a third embodiment of the invention.

FIGS. 6 and 7 show a third embodiment of the invention. In FIGS. 6 and 7, like reference characters are used to designate like or similar parts and components to those of the first embodiment shown in FIGS. 2 and 3, and the description of such like parts and components is therefore omitted. The third embodiment utilizes a pair of auxiliary gears 318 and 318' in lieu of the single auxiliary gear 18 of the first embodiment. The auxiliary gears 318 and 318' are supported by the rotary shaft 16 for rotation relative thereto, with the main gear 17 being interposed between the gears 318 and 318'.

Specifically, the main gear 17 has opposite axial end faces thereof disposed in sliding contact with an opposed axial end face of the auxiliary gear 318', respectively. Grooves 319 is formed in the main gear 17, extending through the wall thereof to form slots, respectively. Similarly, grooves 320 and 320' are respectively formed in the auxiliary gears 318 and 318', also extending through the walls of the respective gears 318, 318' to form slots, respectively. Each groove 319 of the main gear 17 is opposed to corresponding one of the grooves 320 of the auxiliary gear 318 and corresponding one of the grooves 320' of the auxiliary gear 318'. The grooves 320 and 320' each have a length substantially equal to that of the corresponding groove 319 and a width less than that of the latter.

In addition, a weight member 321 in the form of a roller having circular cross-section as shown in FIG. 6 is slidably received in and between each groove 319 of the main gear 17 and the corresponding opposed grooves 320 and 320' in the respective auxiliary gears 318 and 318'. More particularly, the weight member 321 is comprised of an intermediate portion 321a and opposite axial end portions 321b and 321b' having a diameter less than that of the intermediate portion 321a. The intermediate portion 321a is slidably engaged in the groove 319 of the main gear 17, and the axial end portions 321b and 321b' are slidably engaged respectively in the grooves 320 and 320' of the respective auxiliary gears 318 and 318'. Steps 321c and 321c' respectively defined between the intermediate portion 321a and the diameter-reduced axial end portions 321b and 321b' abut slidably against the inner axial end faces of the respective auxiliary gears 318 and 318' opposite to the main gear 17. Thus, the weight member 321 operates in a stable attitude in and between the groove 319 and the corresponding grooves 320 and 320' without falling down.

Figure 8:
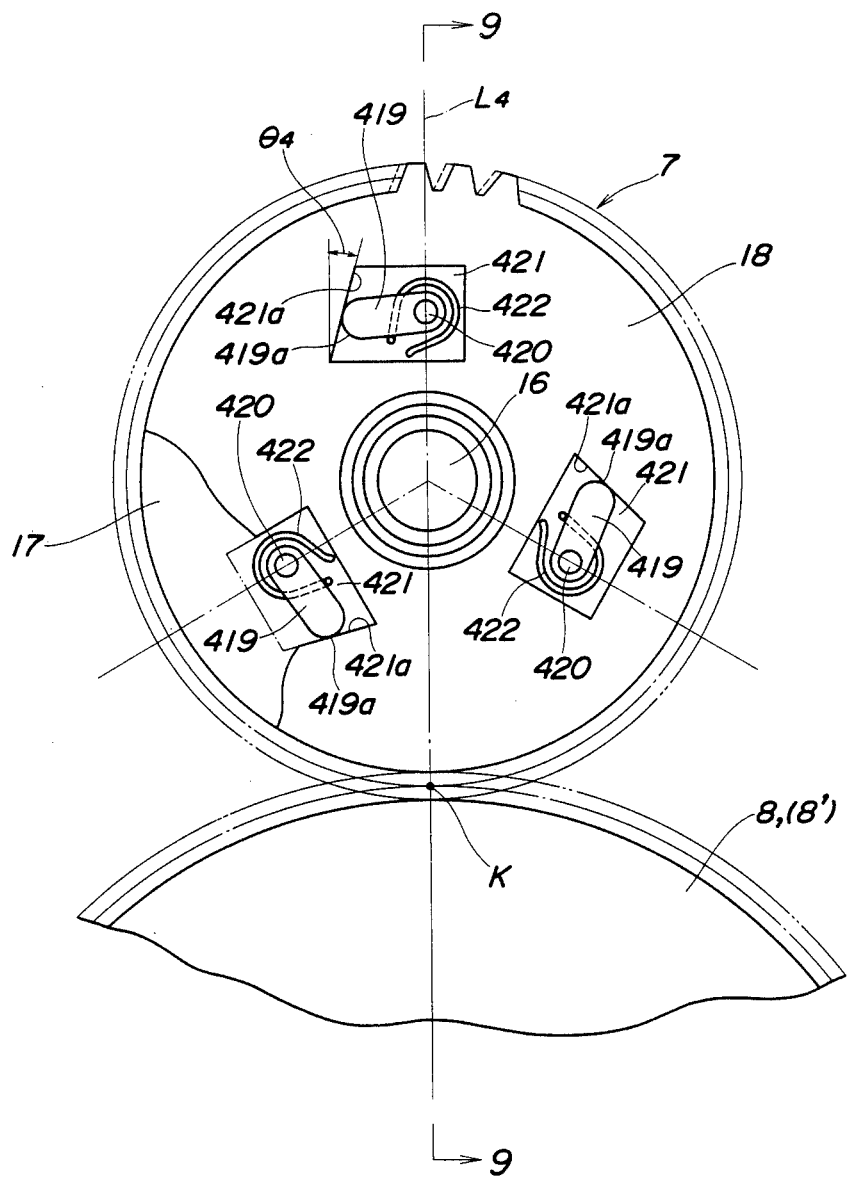
FIG. 8 is a view similar to FIG. 2, but showing a fourth embodiment of the invention.

FIGS. 8 and 9 show a fourth embodiment in which cam members are pivotally mounted on the axial end face of the main gear 17 opposite to the auxiliary gear 18, and are angularly movable in response to the centrifugal force due to the rotation of the rotary shaft 16. In FIGS. 8 and 9, like reference numerals are used to designate like or similar parts and components to those of the first embodiment shown in FIGS. 2 and 3, and the description of such like parts and components is therefore omitted.

Specifically, in the fourth embodiment, a plurality of (three, for example) cam members 419 are pivotally mounted on the axial end face of the main gear 17 opposite to the auxiliary gear 18 in circumferentially equidistantly spaced relation to each other. The cam members 419 are identical in configuration and dimensions to each other and are in the form of an elongated plate having arcuate longitudinal opposite end faces. One of the ends of each of the cam members 419 is pivotally mounted on the main gear 17 by means of a pivot 420 extending through the cam member and rigidly fitted into the main gear, and a face of the other end of the cam member 419 forms a cam surface 419a engageable with corresponding one of engaging surfaces 421a provided on the auxiliary gear 18 to be described later. Each cam member 419 is pivotally received in corresponding one of bores 421 formed through the auxiliary gear 18. The bores 421 are identical in configuration to each other and have a generally rectangular cross-section. One of side wall surfaces of each bore 421 forms the engaging surface 421a which is inclined at a predetermined angle $\theta_4$ to a line $L_4$ passing through the rotational axis of the auxiliary gear 18 and the axis of the corresponding pivot 420 around which the corresponding cam member 420 is pivotable. The engaging surface 421a is engaged by the cam surface 419a of the corresponding cam member 420. The centrifugal force due to rotation of the main and auxiliary gears 17 and 18 in the clockwise direction as viewed in FIG. 8 acts to cause each cam member 419 to be angularly moved around the corresponding pivot 420 in the clockwise direction as viewed in FIG. 8 so that the engaging surface 421a is urgedly engaged by the cam surface 419a of the cam member 419. This causes the auxiliary gear 18 to be angularly moved relative to the main gear 17, to thereby reduce the backlash between the driving idle gear 7 and the intermediate idle gear 8.

Each cam member 419 is biased in the clockwise direction as viewed in FIG. 8 by a corresponding spring 422 interposed between the cam member 419 and wall surfaces of the corresponding bore 421. The spring 422 is formed by a spiral spring which has opposite ends respectively secured to the cam member 419 and the main gear 17.

The operation of the backlash reducer for the gear transmission system in accordance with the fourth embodiment constructed as above will be described below.

Here, similarly to the first embodiment, a case will be considered where a backlash is present at the meshing point K between the main gear 17 and the intermediate idle gear 8. When the gears 17, 18 and 8 are rotated, the centrifugal force is applied to each of the cam members 419 radially outwardly. The cam member 419 is angularly moved in the clockwise direction as viewed in FIG. 8 by the sum of the centrifugal force and the biasing force of the corresponding spring 422. The cam surface 419a of the cam member 419 is urged against the engaging surface 421a of the corresponding bore 421 to cause the auxiliary gear 18 to be angularly moved relative to the main gear 17 in the counterclockwise direction in FIG. 8. Thus, the main and auxiliary gears 17 and 18 are angularly moved relative to each other. The urging force which causes the angular movement is in proportion to the centrifugal force on the cam member 419, i.e., the rotational speed of the main and auxiliary gears 17 and 18. When the rotational speed is low, the relative urging force of the main and auxiliary gears 17 and 18 upon each other is correspondingly low, and the angularly moving force is also correspondingly low. As the rotational speed increases, the relative urging force increases correspondingly, and the angularly moving force also increases correspondingly.

When back torque is applied to the auxiliary gear 18, each cam member 419 is returned against the biasing force of the corresponding spring 422 in accordance with the load of the back torque, because the cam surface 419a of the cam member 419 engages the corresponding engaging surface 421a which is inclined at the angle $\theta_4$ to the line $L_4$.

According to the fourth embodiment, there is obtained a stable torque at low load, since each cam member 419 is urged by the corresponding spring 22 in such a direction as to reduce the backlash.

Figure 10:
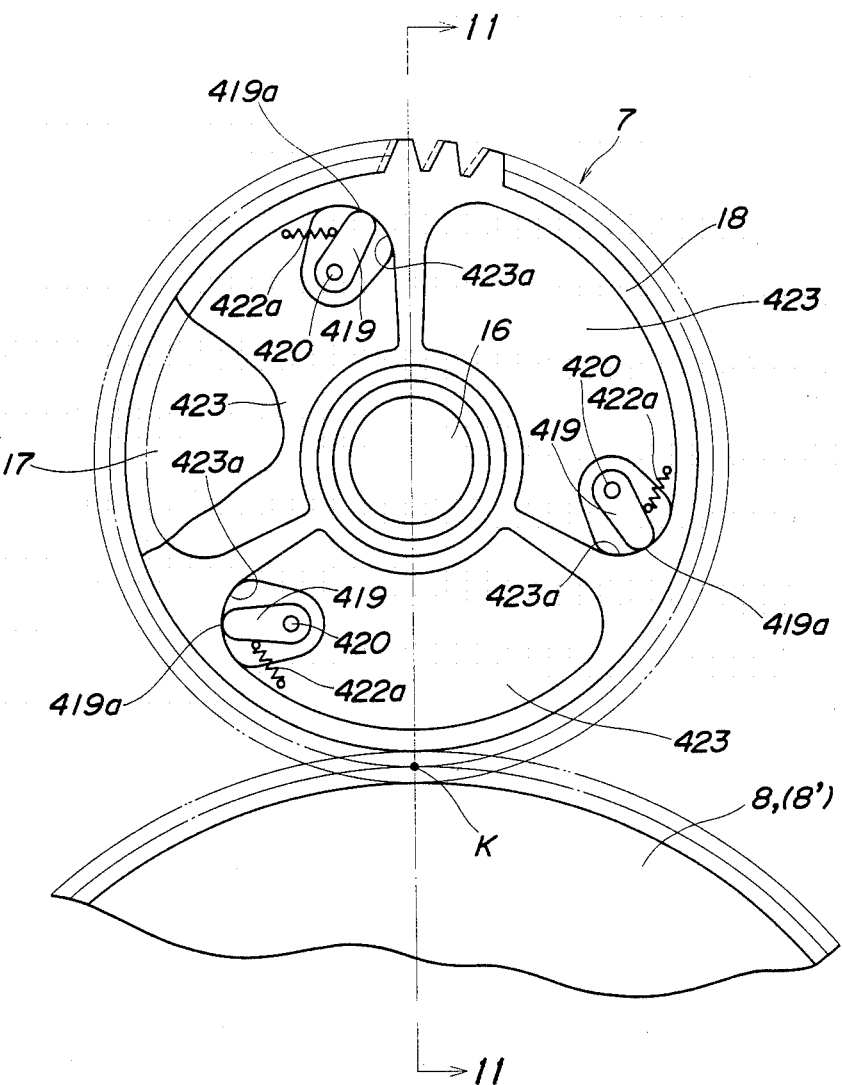
FIG. 10 is a view similar to FIG. 2, but showing a fifth embodimnent of the invention.

FIGS. 10 and 11 show a fifth embodiment of the invention in which cam members are utilized similarly to the fourth embodiment described above with reference to FIGS. 8 and 9. In FIGS. 10 and 11, like reference characters are used to designate like or similar parts and components to those of the fourth embodiment, and the description of such like parts and components is therefore omitted.

In the fifth embodiment, three recesses 423 generally in the form of a segment or fan are provided in the auxiliary gear 18 in circumferentially equidistantly spaced relation to each other. One of corners of each of the recesses 423 forms an arcuate engaging surface 423a. A cam surface 419a of each of cam members 419 pivotally mounted on the main gear 17 engages the arcuate engaging surface 423a of the corresponding recess 423. Each cam member 419 is biased in the counterclockwise direction as viewed in FIG. 10 by means of corresponding one of springs 422a. A center of a radius of curvature of each of the arcuate engaging surfaces 423a is eccentric to the axis of corresponding one of pivots 420 around which the corresponding cam member 419 is pivotable. Accordingly, when the main and auxiliary gears 17 and 18 are rotated in the clockwise direction in FIG. 10, the centrifugal force and the biasing force of each spring 422a cause the corresponding cam member 419 to be angularly moved in the counterclockwise direction in FIG. 10, and the cam surface 419a of the cam member 419 is urged against the corresponding engaging surface 423a. Thus, the auxiliary gear 18 is angularly moved relative to the main gear 17 in the clockwise direction in FIG. 10.

Figure 12:
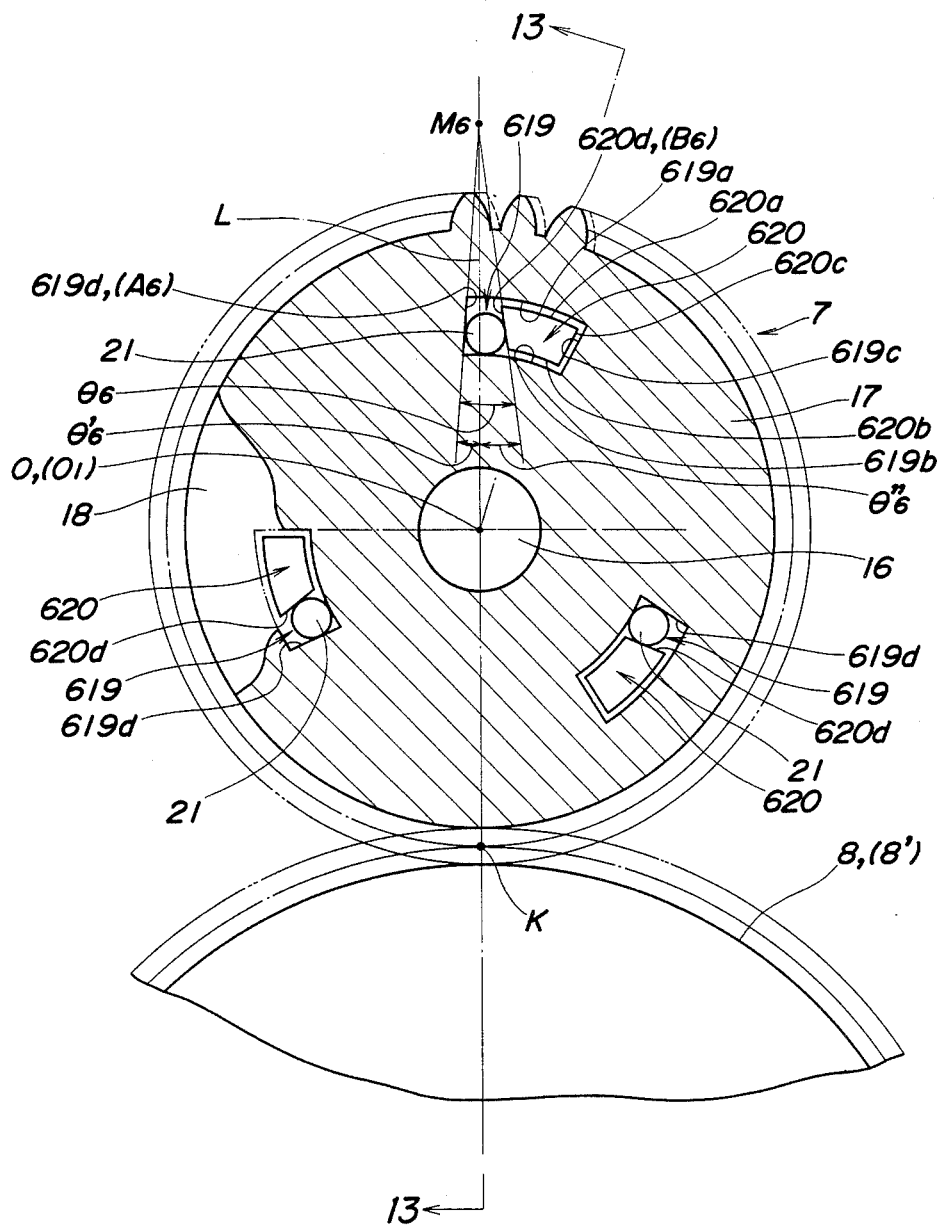
FIG. 12 is a view similar to FIG. 2, but showing a sixth embodiment of the invention.

FIGS. 12 and 13 show a construction of a backlash reducer in accordance with a sixth embodiment of the invention, in which like reference characters are used to designate like or similar parts and components those of the first embodiment described with reference to FIGS. 2 and 3, and the description of such like parts and components is therefore omitted.

In the sixth embodiment, the main gear 17 is provided therein with grooves 619, and the auxiliary gear 18 is provided thereon with projection 620 extending into the respective grooves 619. A surface of each groove 619 and a surface of the corresponding projection 620 opposite thereto form a pair of opposed clamping surfaces $A_6$ and $B_6$. A weight member 21 is movably clamped between each pair of clamping surfaces $A_6$ and $B_6$. The clamping surfaces $A_6$ and $B_6$ are inclined with respect to the line L passing through the center O of the main gear 17, i.e., to a plane including the axis of the rotary shaft 16. The centrifugal force due to the rotation of the main gear 17 causes the weight members 21 to angularly move the main and auxiliary gears 17 and 18 relative to each other through the clamping surfaces $A_6$ and $B_6$.

Specifically, an axial end face of the main gear 17 opposite to the auxiliary gear 18 is formed therein with a plurality of (three, for example) grooves 619 circumferentially equidistantly spaced from each other. The grooves 619 are identical in configuration and dimensions to each other, and each groove 619 has circumferentially extending opposite side surfaces 619a and 619b which are arcuate and concentric with the main gear 17. In addition, one circumferential end surface 619c of each groove 619 is planar and extends radially of the main gear 17. The other circumferential end surface 619d of the groove 619 forms one $A_6$ of the corresponding pair of clamping surfaces between which the corresponding weight member 21 is clamped. The clamping surface $A_6$ is inclined at a predetermined angle $\theta_6$ to the line L passing through the center 0 of the main gear 17 with respect to a point $M_6$ on the line L.

In addition, an axial end face of the auxiliary gear 18 opposite to the main gear 17 is formed thereon with the circumferentially equidistantly spaced projections 620 corresponding in number to the number of the grooves 619. The projections 620 are circumferentially slidably received in the respective grooves 619. The projections 620 are identical in configuration to each other, and each projection 620 has circumferentially extending opposite side surfaces 620a and 620b which are arcuate and concentric with the auxiliary gear 18. One circumferential end surface 620c of each projection 620 is planar and extends radially of the auxiliary gear 18, and the other circumferential end surface 620d of the projection 620 forms the other clamping surface $B_6$ which is opposed to, but spaced at a predetermined distance from the above-described one clamping surface $A_6$. The clamping surface $B_6$ is inclined at a predetermined angle $\theta''_6$ to the line L passing through the center $O_1$ of the auxiliary gear 18 with respect to the point $M_6$ on the line L. The angle of inclination $\theta''_6$ of the clamping surface $B_6$ is different from that $\theta'_6$ of the clamping surface $A_6$, and the sum of the angles of inclination $A_6$ and $B_6$ forms a clamping angle $\theta_6$.

The weight member 21 is radially movably received between the corresponding pair of clamping surfaces $A_6$ and $B_6$, and is oriented so as to have the axis extending parallel to the axis of the rotary shaft 16. The weight members 21 are moved radially outwardly under the centrifugal force when the main and auxiliary gears 17 and 18 are rotated, to thereby enable the backlash between the driving idle gear 7 and the intermediate idle gear 8 to be reduced. The angles of inclination $\theta'_6$ and $\theta''_6$ may satisfy a relationship $\theta'_6 = \theta''_6$ or $\theta'_6 \approx \theta''_6$.

The backlash reducer constructed as above in accordance with the sixth embodiment comprises the clamping surface 619d ($A_6$) provided on each groove 619 of the main gear 17 and the clamping surface 620d ($B_6$) provided on each projection 620 of the auxiliary gear 18, in substitution for the clamping surfaces A and B respectively provided on the grooves 19 and 20 of the first embodiment described before. The sixth embodiment is substantially identical in function and advantage to the first embodiment, and the description of the function and advantage is therefore omitted.

Figure 14:
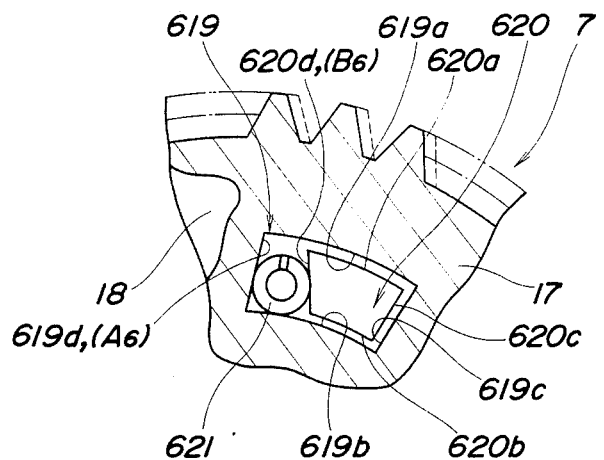
FIG. 14 is a fragmentry cross-sectional view showing a seventh embodiment of the invention.
Figure 15:
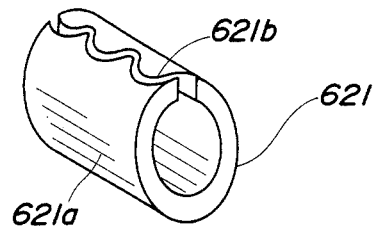
FIG. 15 is a perspective view showing a weight member shown in FIG. 14.

FIGS. 14 and 15 show a seventh embodiment of the invention which is different from the sixth embodiment described above with reference to FIGS. 12 and 13 only in the structure or configuration of weight members. In FIGS. 14 and 15, like reference characters are used to designate like or similar parts and components to those of the sixth embodiment, and the description of such like parts and components is therefore omitted.

Specifically, each of the weight members 621 is comprised of a pipe 621 which is formed of a resilient metallic material and which is formed with a corrugated slit 621b in a peripheral wall of the pipe 621a. Due to a compression spring action of the weight members 621, impact load between the tooth flank of the main gear 17 and the tooth flank of the intermediate idle gear 8 is relieved, and pitching is advantageously prevented by Hertz stress applied to the main gear 17 and the intermediate idle gear 8 due to explosion within engine combustion chambers and fluctuation in inertial torque.

Figure 16:
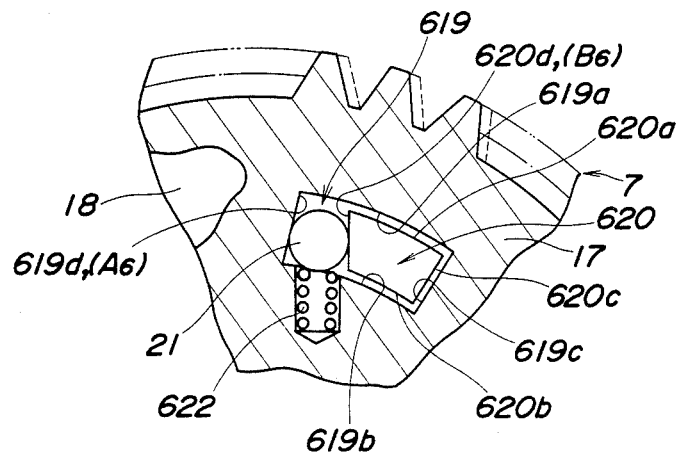
FIG. 16 is a view similar to FIG. 14, but showing an eighth embodiment of the invention.

FIG. 16 shows an eighth embodiment of the invention. In FIG. 16, like reference characters are used to designate like or similar parts and components to those of the sixth embodiment shown in FIGS. 12 and 13, and the description of such parts and components is therefore omitted. The eighth embodiment is different from the sixth embodiment only in that weight members 21 are biased radially outwardly of the main gear 17 by biasing means 622. The biasing means 622 comprises a coil spring, for example. In this manner, since the weight members 21 are biased radially outwardly of the main gear 17 by the biasing means 622, it is ensured that each weight member 21 is aided by the biasing force of the corresponding biasing means 622 and acts in such a direction as to expand the spacing between the corresponding pair of clamping surfaces $A_6$ and $B_6$, even in a low rotational speed range in which no sufficient centrifugal force is applied to the weight member 21.

The biasing means 622 is not limited to the above-described coil spring, but may utilize hydraulic pressure, or may comprise a spring formed of a shape memory alloy, or may utilize an inertia force of a ball, a polygonal-shaped member or the like.

Figure 17:
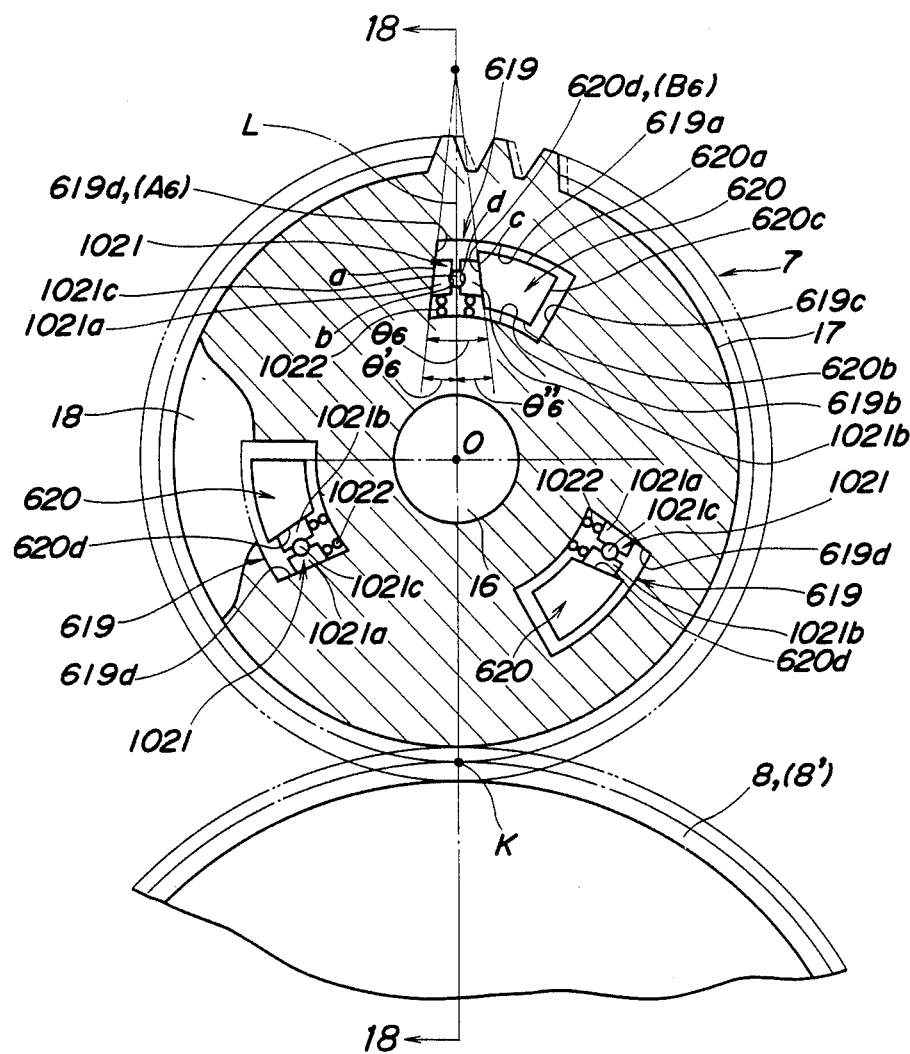
FIG. 17 is a view similar to FIG. 2, but showing a ninth embodiment of the invention.

FIGS. 17 and 18 show a construction of a backlash reducer in accordance with a ninth embodiment of the invention. In FIGS. 17 and 18, like reference characters are used to designate like or similar parts and components to those of the sixth embodiment shown in FIGS. 12 and 13, and the description of such like parts and components is therefore omitted.

The backlash reducer shown in FIGS. 17 and 18 includes weight members 1021 each of which is comprised of a first retainer member 1021a having a sliding contact surface in sliding contact with a corresponding one of clamping surfaces $A_6$ provided on the main gear 17, with a recess being formed in a surface of the retainer member 1021a opposite to the sliding contact surface thereof, a second retainer member 1021b having a sliding contact surface in sliding contact with a corresponding one of clamping surfaces $B_6$ provided on the auxiliary gear 18, with a recess being formed in a surface of the retainer member 1021b opposite to the sliding contact surface thereof, and a slide member 1021c disposed between the opposed recesses in the respective retainer members 1021a and 1021b.

Specifically, each of the weight members 1021 is received movably radially of the main gear 17 between corresponding one of pairs of clamping surfaces $A_6$ and $B_6$, and is comprised of the first and second retainer members 1021a and 1021b and the slide member 1021c. The first retainer member 1021a has the sliding contact surface a in sliding contact with the clamping surface $A_6$. The recess b having a generally semi-circular cross-section is formed in the surface of the retainer member 1021a opposite to the sliding contact surface a thereof. The second retainer member 1021b has the sliding contact surface c in sliding contact with the clamping surface $B_6$. The recess d having a generally semi-circular cross-section is formed in the surface of the retainer member 1021b opposite to the sliding surface c thereof. The slide member 1021c is disposed between the opposed recesses b and d in the respective retainers members 1021a and 1021b and is in the form of a roller having a circular cross-section and having an outer peripheral surface in sliding contact with the recesses b and d. The slide member 1021c has the axis thereof extending parallel to the axis of the rotary shaft 16. The slide member 1021c may be in the form of a sphere. The retainer members 1021a and 1021b and the slide member 1021c which are components forming each weight member 1021 are biased radially outwardly of the main gear 17 by corresponding biasing means 1022 comprising a coil spring. The weight members 1021 are moved radially outwardly by the centrifugal force due to the rotation of the main and auxiliary gears 17 and 18, to angularly move them relative to each other through the clamping surfaces $A_6$ and $B_6$, to thereby enable the backlash between the driving idle gear 7 and the intermediate idle gear 8 to be reduced.

In the backlash reducer constructed as above in accordance with the ninth embodinent, each retainer member 1021a which is a component of the corresponding weight member 1021 has one lateral side surface entirely disposed in sliding contact with the corresponding clamping surface $A_6$ and the other lateral side surface including an arcuate engaging surface portion located generally centrally of the other lateral side surface and entirely disposed in sliding contact with the corresponding slide member 1021c. In addition, one lateral side surface of each retainer member 1021b is entirely disposed in sliding contact with the corresponding clamping surface $B_6$, and an arcuate engaging surface portion generally at a center of the other lateral side surface of the retainer member 1021b is entirely disposed in sliding contact with the corresponding slide member 1021c. Each pair of retainer members 1021a and 1021b are moved radially in response to a change in the clamping angle $\theta_6$ between the corresponding pair of clamping surfaces $A_6$ and $B_6$. The backlash is reduced by the radial movement of the retainer members 1021a and 1021b and the biasing force of the biasing means 1022a. The weight members 1021 are advantageous in that the surface pressure is reduced, because each slide member 1021c is constantly held in surface contact with the corresponding pair of retainer members 1021a and 1021b, and each pair of retainer members 1021a and 1021b is constantly held in surface contact with the respective corresponding clamping surfaces $A_6$ and $B_6$, so that the surface pressure is reduced.

A backlash reducer in accordance with tenth to twelfth embodiments will next be described, which comprises backlash reducing means operable in response to the centrifugal force due to rotation of the rotary shaft 16 for reducing the backlash and means for restraining the backlash reducing action by the backlash reducing means.

Figure 19:
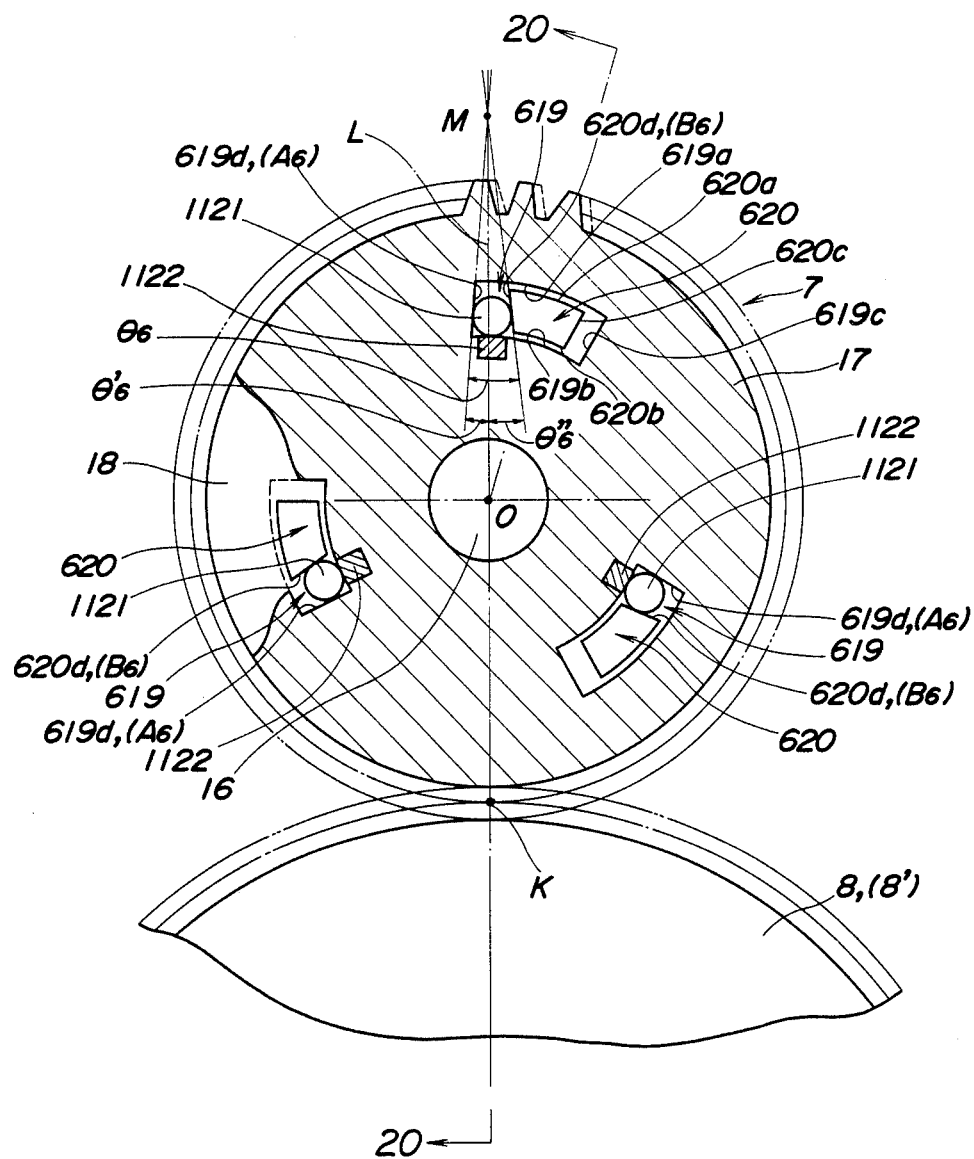
FIG. 19 is a view similar to FIG. 2, but showing a tenth embodiment of the invention.

FIGS. 19 and 20 show the backlash reducer in accordance with the tenth embodiment, which comprises the means for restraining the backlash reducing action, in addition to the backlash reducing means of the sixth embodiment described with reference to FIGS. 12 and 13.

Specifically, each of weight members 1121 which form first means for reducing the backlash is received between corresponding one of pairs of clamping surfaces $A_6$ and $B_6$ provided respectively on the main and auxiliary gears 17 and 18 so as to be movable radially of the main gear 17. The weight member 1121 is in the form of a roller having a circular cross-section and is formed of a magnetic metallic material. The weight member 1121 has the axis extending parallel to the axis of the rotary shaft 16. The weight member 1121 may be in the form of a sphere, a block or the like. The weight members 1121 are moved radially outwardly under the centrifugal force due to the rotation of the main and auxiliary gears 17 and 18 to cause same to be angularly moved relative to each other, to thereby reduce the backlash between the driving idle gear 7 and the intermediate idle gear 8.

Each of magnets 1122 which are comprised of a permanent magnet or the like and which form second means for restraining the backlash reducing action by the weight members 1121 is embedded in the main gear 17 and is located adjacent one end of a circumferentially extending, radially inner side surface 619b of the corresponding groove 619. The magent 1122 has a surface substantially flush with the inner side surface 619b of the corresponding groove 619 and is adapted to attract the corresponding weight member 1121 toward the center 0 of the main gear 17, i.e., in such a direction as to release the angularly moving force at a low centrifugal force.

The operation of the backlash reducer constructed as above in accordance with the tenth embodiment will be described. Here, similarly to the sixth embodiment shown in FIGS. 12 and 13, a case will be considered where a backlash is present at the meshing point K between the main gear 17 and the intermediate idle gear 8. The gears 17 and 18 are oscillated between a pair of adjacent gear teeth of the intermediate idle gear 8 in response to fluctuation in torque during rotation of the gears 17 and 18. As a result, a circumferential spacing between each pair of clamping surfaces $A_6$ and $B_6$ is repeatedly enlarged and reduced. Upon the enlargement, each weight member 1121 becomes clamped between the corresponding pair of clamping surfaces $A_6$ and $B_6$ under the centrifugal force due to the rotation of the rotary shaft 16, when the centrifugal force overcomes the attracting force of the corresponding magnet 1122. That is, the centrifugal force is principally utilized to move the weight members 1121 in such a direction as to minimize the backlash.

On the other hand, when the centrifugal force does not occur which is sufficient to overcome the attracting force of the magnet 1122, the corresponding weight member 1121 is attracted by the magnet 1122 and is held at a position near the center of the main gear 17, so that the backlash reducer is brought into such a condition that the angularly moving force is forcibly released during operation of the engine in a cold condition. Thus, the backlash increases during the low rotational speed operation in which the centrifugal force is low. This facilitates the assembling of the main and auxiliary gears 17 and 18 with the mating gears, and ensures the release of the angularly moving force.

Figure 21:
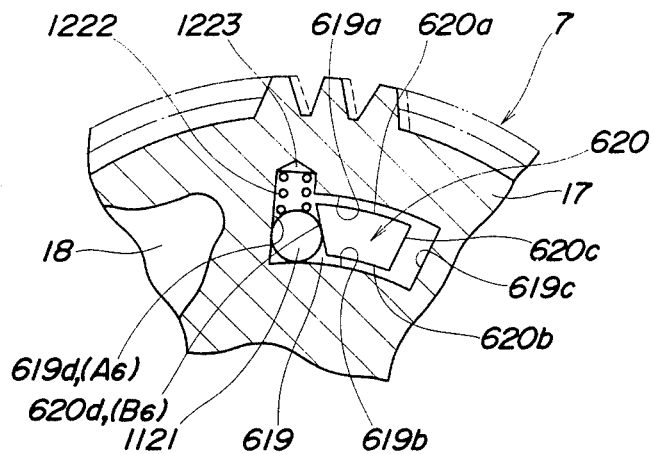
FIG. 21 a view similar to FIG. 14, but showing an eleventh embodiment of the invention.

FIG. 21 shows an eleventh embodinent of the invention which is different from the tenth embodiment described above with reference to FIGS. 19 and 20 only in the construction or structure of the second means for restraining the backlash reducing action of the weight members 1121. In FIG. 21, like reference characters are used to designate like or similar parts and components to those of the tenth embodiment, and the description of such like parts or components is therefore omitted.

The second means in the eleventh embodiment is comprised of coil springs 1222 each of which is disposed within a bore 1223 located at one end of the circumferentially extending, radially outer side surface 619a of the corresponding groove 619 in the main gear 17. When the rotational speed of the main and auxiliary gears 17 and 18 is low and when the centrifugal force is not generated which is sufficient to overcome the biasing force of the coil springs 1222, each weight member 1121 is biased and held at a position near the center of the main gear 17 by the corresponding coil spring 1222 so that the backlash reducer is brought into such a condition that the angularly moving force is forcibly released during engine operation in a cold condition.

Figure 22:
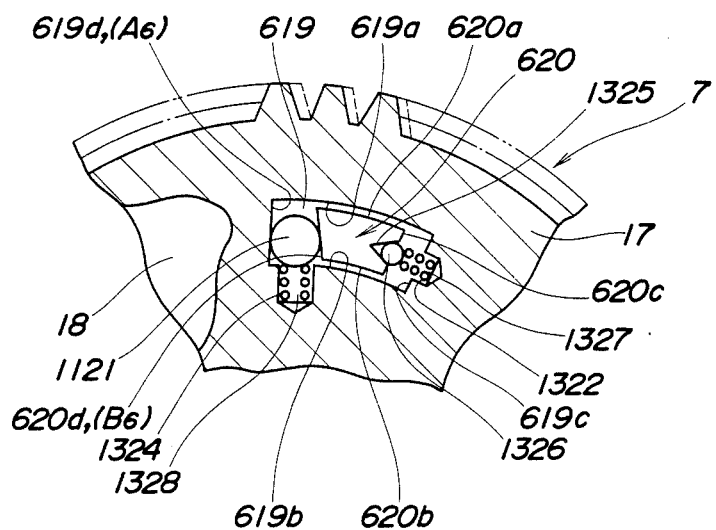
FIG. 22 is a view similar to FIG. 14, but showing a twelfth embodiment of the invention.

FIG. 22 shows a twelfth embodiment of the invention. In FIG. 22, like reference numerals are used to designate like or similar parts and components to those of the tenth embodiment described above with reference to FIGS. 19 and 20, and the description of such like parts and components is therefore omitted.

The twelfth embodiment is different from the tenth embodiment in that each of weight members 1121 is biased radially outwardly of the main gear 17 by corresponding one of coil springs 1324, a V-shaped groove 1325 is provided centrally in one circumferential end surface of each of projections 620 of the auxiliary gear 18, one end of each of coil springs 1322 forming the second means abuts against the corresponding V-shaped groove 1325 through a ball 1326, and the other end of the coil spring 1322 abuts against a bottom of a bore formed generally centrally in one circumferential end wall surface 619c of the corresponding groove 619 in the main gear 17. The coil spring 1324 is disposed within a bore 1328 provided adjacent one end of a circumferentially extenidng, radially inner side surface 619b of the groove 619 in the main gear 17. During low rotational speed operation in which the centrifugal force is low, the weight member 1121 is urged and moved toward the center of the main gear 17 against the biasing force of the coil spring 1324, by the biasing force of the coil spring 1322 forming the second means, so that the backlash reducer is brought into such a condition that the angularly moving force is forcibly released.

The second means for restraining the backlash reducing action of the first means is not limited to the above-described magnets or coil springs, but may utilize other forces such as, for example, hydraulic pressure or the like. In addition, if vibration is applied to the gears with the gears being maintained horizontal in assembling, the weight of the weight members 1121 may be utilized to return the weight members 1121 to their predetermined positions near the center of the main gear 17.

A backlash reducer in accordance with a thirteenth and fourteenth embodiments of the invention will now be described in which the centrifugal force due to rotation of the rotary shaft 16 is converted to a relative circumferential force between the main and auxiliary gears 17 and 18 by means of levers having respective weight members provided thereon.

Figure 23:
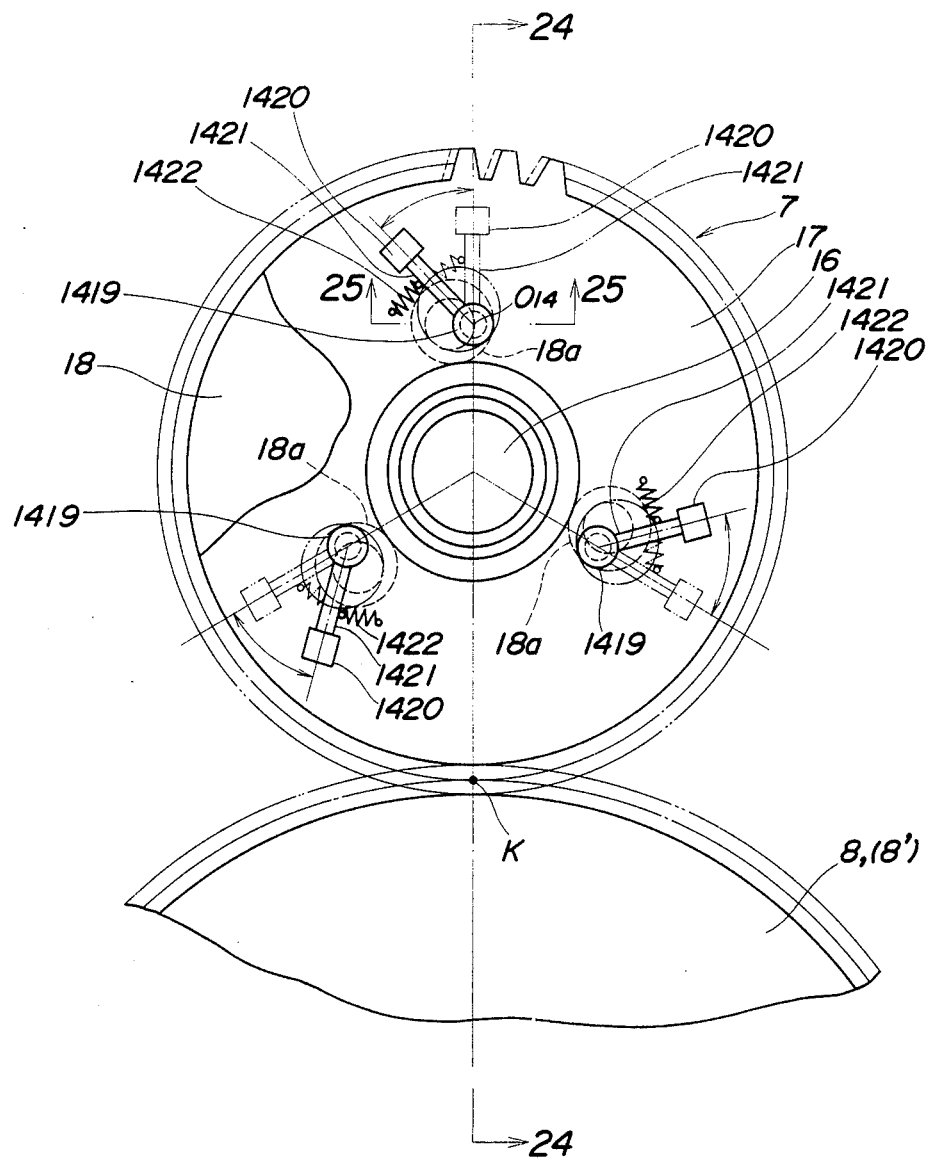
FIG. 23 is a view similar to FIG. 2, but showing a thirteenth embodiment of the invention.

FIGS. 23 through 25 show the thirteenth embodiment. In the figures, like reference characters are used to designate like or similar parts and components to those of the first embodiment described with reference to FIGS. 2 and 3, and the description of such like parts and components is therefore omitted.

The thirteenth embodiment comprises a plurality of (three, for example) backlash reducing members 1419 disposed between the main and auxiliary gears 17 and 18 in circumferentially equidistantly spaced relation to each other. The reducing members 1419 are identical in structure and arrangement to each other, and each reducing member 1419 comprises a rod 1419b which has a tip portion having an annular tapered surface 1419a and which has an outer peripheral surface having threads 1419c formed thereon. Each rod 1419b threadedly engages corresponding one of threaded bores 17a formed in the main gear 17. The tip portion of each rod 1419b extends into corresponding one of tapered bores 18a provided in the auxiliary gear 18. The axis $0_{14}$ of each rod 1419b is in eccentric relation to the central axis of the corresponding tapered bore 18a with respect to the circumferential direction of the main gear 17. The tapered surface 1419a of each rod 1419b is disposed for sliding contact with an annular tapered surface of the corresponding tapered bore 18a. A screw feed action due to angular movement of each rod 1419b in one direction causes the rod 1419b to be moved axially thereof toward the auxiliary gear 18 on the left hand as viewed in FIG. 24 and in a direction Y in FIG. 25, to thereby bring the tapered surface 1419a of the rod 1419b into sliding contact with the tapered surface of the corresponding tapered bore 18a. A component of forcer developed when each pair of tapered surfaces is brought into sliding contact with each other causes the main and auxiliary gears 17 and 18 to be angularly moved relative to each other, to thereby reduce the backlash between the driving idle gear 7 and the intermediate idle gear 8, 8'. The opposite base end of each rod 1419b extends outwardly from the main gear 17. Each of levers 1421 has a base end connected to the outwardly extending end of the corresponding rod 1419b and the opposite tip end having a weight member 1420 provided thereon. Each lever 1421 has the axis thereof extending perpendicularly to the axis of the corresponding rod 1421b. The centrifugal force due to rotation of the main and auxiliary gears 17 and 18 is converted to a circumferential force in the clockwise direction as viewed in FIG. 23 by the corresponding lever 1421 having the weight member 1420 mounted thereon, to thereby angularly move the lever 1421 together with the corresponding rod 1419b in one direction, i.e., in the clockwise direction as viewed in FIG. 23. Each rod 1419b together with the corresponding lever 1421 is biased in the other direction, i.e., in the counterclockwise directrion in FIG. 23 by corresponding one of springs 1422. The spring 1422 has one end thereof secured to the lever 1421 and the other end secured to an outer axial end face of the main gear 17.

The operation of the backlash reducer for the gear transmission system in accordance with the thirteenth embodiment constructed as above will be described. Here, similarly to the first embodiment, a case will be considered where a backlash is present at the meshing point K between the main gear 17 and the intermediate idle gear 8. The centrifugal force due to the rotation of the gears 17, 18 and 8 causes each weight member 1420 together with the corresponding lever 1421 to be angularly moved against the biasing force of the corresponding spring 1422 in the clockwise direction in FIG. 23, so that the corresponding rod 1419b is also angularly moved together with the lever 1421 in the clockwise direction in FIG. 23. By the screw feed action due to the angular movement, the rod 1419b is moved toward the auxiliary gear 18 in the left in FIG. 24 and in the direction Y in FIG. 25, to thereby bring the tapered surface 1419a of the rod 1419b into sliding contact with the tapered surface fo the corresponding tapered bore 18a. The component of force upon the sliding contact causes the main and auxiliary gears 17 and 18 to be angularly moved relative to each other, to thereby angularly move the auxiliary gear 18 into a circumferentially offset position with respect to the gear 17, i.e., in the clockwise direction in FIG. 23 and in the direction Y in FIG. 25. The urging force for the angular movement is in proportion to the centrifugal force acting on the weight members 1420 and the levers 1421, i.e., to the rotational speed of the main and auxiliary gears 17 and 18. When the rotational speed is low, the urging force acting on the main and auxiliary gears 17 and 18 so as to angularly move same relative to each other is low correspondingly to the rotational speed and, accordingly, the angularly moving force is also low. As the rotatrional speed increases, the urging force acting on the main and auxiliary gears 17 and 18 increases correspondingly to the rotational speed and, accordingly, the angularly moving force also increases.

Figure 26:
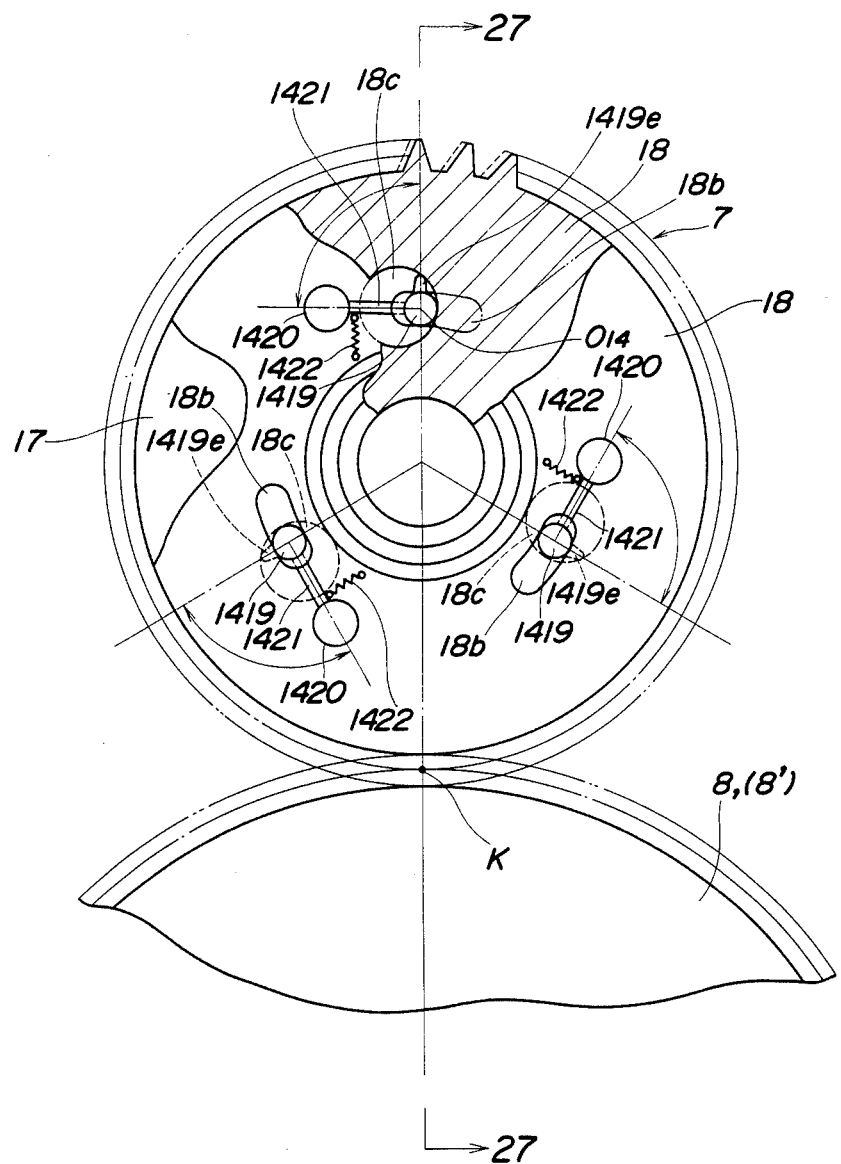
FIG. 26 is a view similar to FIG. 2, but showing a fourteenth embodiment of the invention.

FIGS. 26 and 27 show a fourteenth embodiment which is different from the above-described thirteenth embodiment shown in FIGS. 23 through 25 in the structure or construction of the backlash reducing members. In FIGS. 26 and 27, like reference characters are used to designate like parts and components to those of the thirteenth embodiment, and the description of such like parts and components is therefore omitted.

Specifically, each of backlash reducing members 1419 comprises a rod 1419d and an elliptic cam 1419e secured to an axially intermediate portion of the rod 1419d. Each of the rods 1419d has one end thereof pivotally fitted in corresponding one of circular recesses 17b formed in the main qear 17, and the other end slidably fitted in corresponding one of elongated arcuate slots 18b formed in the auxiliary gear 18. The elliptic cam 1419e is disposed within corresponding one of circular recesses 18c provided in an axial end face of the auxiliary gear 18 opposite to the main gear 17, for slidable engagement with a peripheral wall surface of the recess 18c. The center of each recess 18c is in eccentric relation to the center of the corresponding elliptic cam 1419e in the circumferential direction of the main gear 17. Each rod 1419d has an outer end to which is connected a lever 1420 having a weight member 1420 secured thereto. The lever 1421 is biased by a spring 1422 in the counterclockwise direction as viewed in FIG. 26. Thus, the centrifugal force due to the rotation of the main and auxiliary gears 17 and 18 causes each lever 1421 together with the weight member 1420 to be angularly moved against the biasing force of the spring 1422 in the clockwise direction as viewed in FIG. 26, so that the rod 1419d is also rotated together with the lever 1421 in the clockwise direction in FIG. 26. The rotation of the rod 1419d causes a cam surface of the elliptic cam 1419e to be urged against the peripheral wall surface of the circular recess 18c, to thereby angularly move the main and auxiliary gears 17 and 18 relative to each other, so that the auxiliary gear 18 is angularly moved in the clockwise direction in FIG. 26 to provide a se-lashing force in proportion to the rotational speed.

A backlash reducer in accordance with fifteenth to twenty-first embodiments will be described. The backlash reducer comprises first means operable in response to the centrifugal force due to rotation of the main and auxiliary gears 17 and 18 for moving the auxiliary gear 18 axially thereof, and second means for converting axial movement of the auxiliary gear 18 to a circumferential movement thereof. The auxiliary gear 18 is angularly moved relative to the main gear 17 by the action of the first and second means in response to the centrifugal force due to rotation of the main and auxiliary gears 17 and 18.

Figure 28:
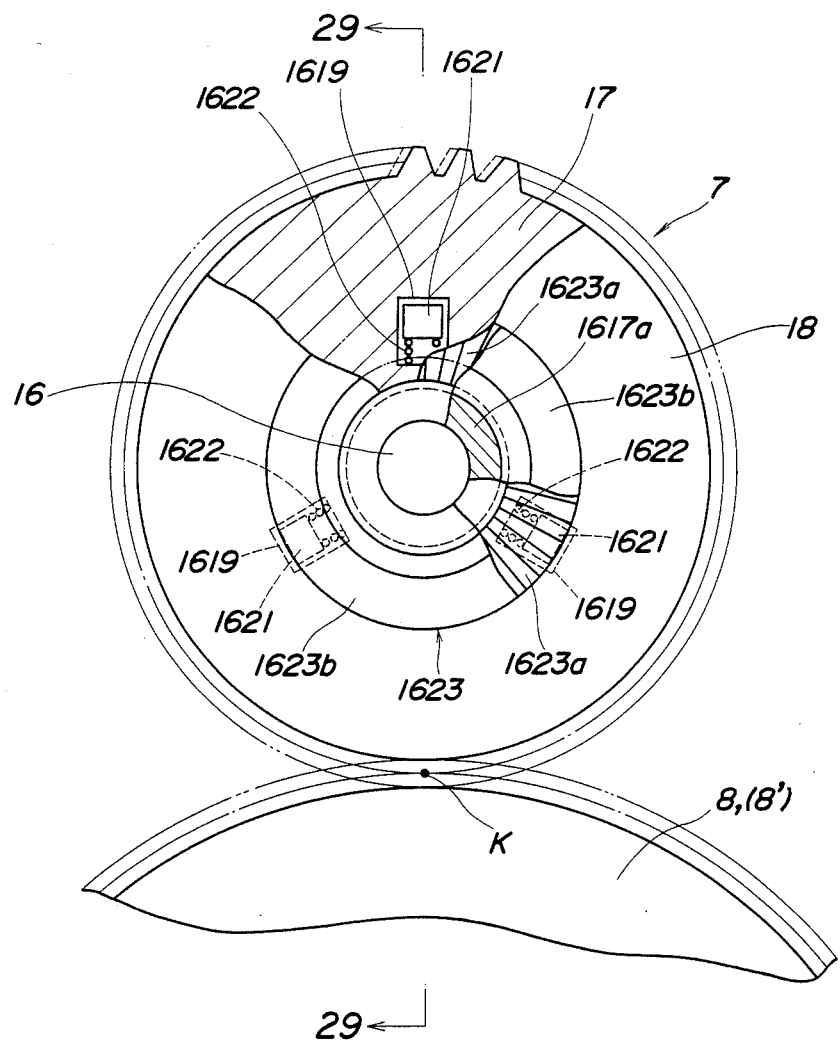
FIG. 28 is a view similar to FIG. 2, but showing a fifteenth embodiment of the invention.
Figure 30:
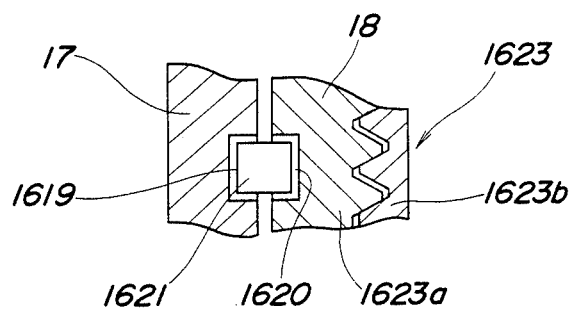
FIG. 30 is a cross-sectional view taken along the line 30—30 in FIG. 29.

FIGS. 28 through 30 show the backlash reducer in accordance with the fifteenth embodiment which comprises a plurality of (three, for example) grooves 1619 provided in an axial end face of the main gear 17 opposite to the auxiliary gear 18 in circumferentially edquiditantly spaced relation to each other. The grooves 1619 are identical in configuration and dimensions to each other and have a rectangular transverse cross-section (refer to FIG. 28). As shown in FIG. 29, each of the grooves 1619 has a bottom which is comprised of a planar surface 1619a extending perpendicularly to the axis of the rotary shaft 16 from a central portion of the bottom to an inner end near the center of the main gear 17, and an inclined surface 1619b extending from the central portion to the other outer end so as to progressively approach the auxiliary gear 18 as the bottom approaches the outer periphery of the main gear 17.

Opposed, respectively, to the grooves 1619 of the main gear 17 are grooves 1620 provided in an axial end face of the auxiliary gear 18 opposite to the main gear 17 in circumferentially equidistantly spaced relation to each other. Each of the grooves 1620 is symmetric in configuration to the corresponding groove 1619 of the main gear 17, and has a rectangular cross-section. As shown in FIG. 29, each groove 1620 has a bottom which is comprised of a planar surface 1620a extending perpendicularly to the axis of the rotary shaft 16 from a central portion of the bottom to an inner end near the center of the auxiliary gear 18, and an inclined surface 1620b extending from the central portion to the other outer end so as to progressively approach the main gear 17 as the bottom approaches the outer periphery of the auxiliary gear 18.

Each of weight mambers 1621 forming the first means is interposed between corresponding one of pairs of opposed grooves 1619 and 1620. The weight member 1621 is in the form of a roller like a stub, but may be in the form of a sphere or a block. The weight members 1621 are moved radially outwardly in response to the centrifugal force due to rotation of the main and auxiliary gears 17 and 18, to thereby move the auxiliary gear 18 axially thereof. Each of the weight members 1621 is biased by a coil spring 1622 radially outwardly toward the outer periphery of the main gear 17 so that the weight member 1621 abuts against the respective inclined surfaces 1619b and 1620b of the corresponding pair of grooves 1619 and 1620.

Bud-serrations 1623 forming the second means are provided between a central portion of an outer axial end face of the auxiliary gear 18 on a side thereof remote from the main gear 17 and an outer peripheral surface of axial one end portion of a hub 1617a. of the main gear 17. The bud-serrations 1623 act to convert axial movement of the auxiliary gear 18 to circumferential movement thereof, and comprises, as shown in FIGS. 28 through 30, a corrugated toothed surface mamber 1623a secured to or integrally formed over the entire circumference of the central portion of the outer axial end face of the auxiliary gear 18 and a corrugated toothed surface member 1623b mounted on the outer periphery of the hub 1627a of the main gear 17 for rotation with the hub 1617a and engaging the corrugated toothed surface member 1623a. When the auxiliary gear 18 is moved axially, ridges of the teeth of the corrugated toothed surface member 1623a are respectively brought into sliding contact with inclined flanks of the teeth of the corrugated toothed surface mamber 1623b. A component of force generated by the sliding contact causes the auxiliary gear 18 to be angularly moved into an angularly offset position with respect to the gear 17, i.e., in the clockwise direction as viewed in FIG. 28 relatived to the main gear 17, to thereby reduce the backlash between the driving idle gear 7 and the intermediate idle gear 8.

The operation of the backlash reducer constructed as described above in accordance with the fifteenth embodiment will be described.

Here, similarly to the first embodiment, a case will be considered where a backlash is present at the meshing point K between the main gear 17 and the intermediate idle gear 8. When the gears 17, 18 and 8 are rotated, a centrifugal force is applied to the weight members 1621 radially outwardly to move same toward the outer periphery of the main gear 17. The radially outward movement of the weight members 1621 causes the auxiliary gear 18 to be moved axially away from the main gear 17, i.e., in the rightward direction as viewed in FIG. 29. By the axial movement of the auxiliary gear 18, the ridges of the teeth of the corrugated toothed surface member 1623a integral with the auxiliary gear 18 are brought into sliding contact with the inclined flanks of the teeth of the corrugated toothed surface member 1623b mounted on the hub 1617a of the main gear 17. The component of force generated by the sliding contact causes the main and auxiliary gears 17 and 18 to be angularly moved relative to each other, to thereby angularly move the auxiliary gear 18 in the angularly moving direction. The urging force for the angular movement is in proportion to the centrifugal force on the weight members 1621, i.e., to the second power or and square of the rotational speed of the main and auxiliary gears 17 and 18. When the rotational speed is low, the urging force acting on the gears 17 and 18 so as to angularly move same relative to each other is low correspondingly to the low rotational speed and, accordingly, the angularly moving force is also low. As the rotational speed increases, the urging force on the main and auxiliary gears 17 and 18 increases and, accordingly, the angularly moving force also increases.

Figure 31:
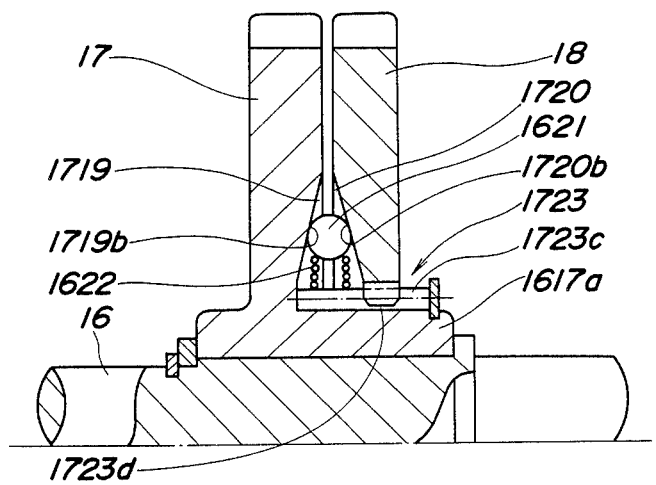
FIG. 31 is a fragmentary cross-sectional view showing a sixteenth embodiment of the invention.

FIG. 31 shows a sixteenth embodiment of the invention which is different from the fifteenth embodiment shown in FIGS. 28 through 30 only in the construction and arrangement of the second means and the grooves. In FIG. 31, like reference characters are used to designate like or similar parts and components of the fifteenth embodiment, and the description of such like parts and components is therefore omitted.

Specifically, second means 1723 of the sixteen embodiment is comprised of spiral splines 1723c formed on an outer peripheral surface of a hub 1617c of the main gear 17, and spline grooves 1723d formed in an inner peripheral surface of the auxiliary gear 18 and slidably engaging the splines 1723c. In addition, each groove 1719 in the main gear 17 and each groove 1720 in the auxiliary gear 18 do not have planar surfaces corresponding respectively to the planar surface 1619a and the planar surface 1620a of the above-described fifteenth embodiment, but have only inclined surfaces 1719b and 1720b, respectively. Accordingly, when the auxiliary gear 18 is moved axially, the engagement between the splines 1723c and the spline grooves 1723d causes the main and auxiliary gears 17 and 18 to be angularly moved relative to each other, to thereby angularly move the auxiliary gear 18 to make it angularly offset with respect to the gear 17.

Figure 32:
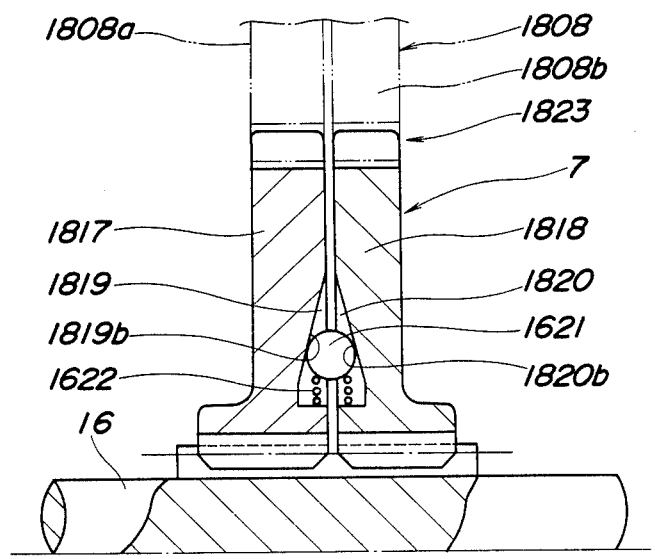
FIG. 32 is a view similar to FIG. 31, but showing a seventeenth embodiment of the invention.

FIG. 32 shows a seventeenth embodiment which is different from the fifteenth embodiment described with reference to FIGS. 28 through 30 in the construction and arrangement of the second means, main gear, auxiliary gear, intermediate idle gear and grooves. In FIG. 32, like reference characters are used to designate like or similar parts and components of the fifteenth embodiment, and the description of such like parts and components is therefore omitted.

Specifically, second means 1823 of the seventeenth embodiment is comprised of tooth flanks of helical gears. More particularly, each of the main gear 1817 and the auxiliary gear 1818 is formed by a helical gear, and the intermediate gear 1808 is constituted by two helical gears 1808a and 1808b which are in mesh with the main and auxiliary gears 1817 and 1818, respectively. Each of grooves 1819 in the main gear 1817 and each of grooves 1820 in the auxiliary gear 1818 do not have planar surfaces, but have only inclined surfaces 1819b and 1820b, respectively, similarly to the above-described sixteenth embodiment. Accordingly, when the auxiliary gear 1818 is moved axially, a component of force due to the engagement between the helical tooth flanks of the gear tooth of the respective helical gears causes the main and auxiliary gears 1817 and 1818 to be angularly moved relative to each other, to thereby angularly move the auxiliary gear 1818 to make the gears 1817, 1818 angularly offset from each other.

Figure 33:
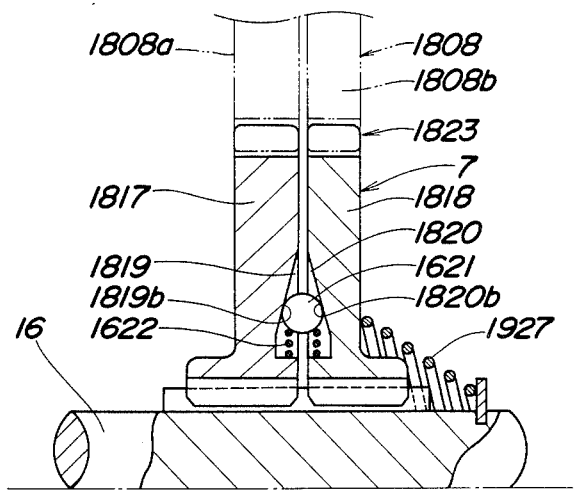
FIG. 33 is a view similar to FIG. 31, but showing an eighteenth embodiment of the invention.

FIG. 33 shows an eighteenth embodiment of the invention which is identical with the seventeenth embodiment shown in FIG. 32 except that the auxiliary gear 18 is biased toward the main gear 1817 by means of a coil spring 1927. In FIG. 33, like reference characters are used to designate like or similar parts and components to those shown in FIG. 32, and the description of such like parts and components is therefore omitted.

Figure 34:
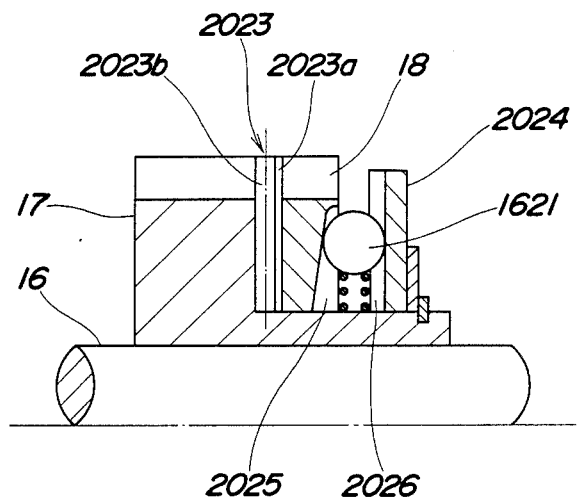
FIG. 34 is a view similar to FIG. 31, but showing a nineteenth embodiment of the invention.

FIG. 34 shows a nineteenth embodiment of the invention which is different from the fifteenth embodiment described with reference to FIGS. 28 through 30 in that bud-serrations forming the second means are provided on opposed axial end faces of the respective main and auxiliary gears 17 and 18, a retainer plate 2024 is mounted on an outer peripheral surface of a hub of the main gear 17 for rotation therewith in opposed, but spaced relation to the outer axial end face of the auxiliary gear 18, and each of weight members 1621 forming the first means is slidably interposed between corresponding one of engaging grooves 2025 formed in an axial end face of the auxiliary gear 18 opposite to the retainer plate 2024 and corresponding one of engaging grooves 2026 formed in an axial end face of the retainer plate 2024 opposite to the auxiliary gear 18. In the case of the nineteenth embodiment, the action of the centrifugal force generated when the main and auxiliary gears 17 and 18 are rotated together with the retainer plate 2024 causes each weight member 1621 to be moved radially outwardly between the corresponding pair of engaging grooves 2025 and 2026, whereby the auxiliary gear 18 is moved to the left as viewed in FIG. 34. The leftward movement of the auxiliary gear 18 causes tooth ridges of a corrugated toothed surface member 2023a secured to or integral with the auxiliary gear 18 to be brought into sliding contact with tooth flanks of a corrugated toothed surface member 2023b secured to or integral with the main gear 17. A component of force due to the sliding contact results in angular movement of the main and auxiliary gears 17 and 18 relative to each other, to thereby angularly move the auxiliary gear 18 to make the gear 18 angularly offset with respect to the gear 17. In FIG. 34, like reference numerals are used to designate like or similar components to those of the fifteenth embodiment shown in FIGS. 28 through 30, and the description of such similar components is therefore omitted.

FIG. 35 shows a twentieth embodiment of the invention. In FIG. 35, like reference numerals are used to designate like or similar parts and components to those of the fifteenth embodiment shown in FIGS. 28 through 30, and the description of such similar parts and components is therefore omitted. The twenthieth embodiment is different from the fifteenth embodiment described with reference to FIGS. 28 through 30 in that the main gear 2117 is provided thereon with auxially inclined surfaces 2128, the auxiliary gear 2118 is provided thereon with engaging projections 2130 having respective circumferentially inclined surfaces 2129 corresponding to the inclined surfaces 2128, the engaging projections 2130 are engageable respectively with the inclined surfaces 2128 through openings (not shown) formed through the main gear 2117, and each of weight members 1621 is slidably interposed between corresponding one of pairs of opposed grooves 2119 and 2120 which are formed respectively in opposed axial end faces of the respective main and auxiliary gears 2117 and 2118 and which are located radially outwardly of the inclined surfaces 2128. In the twentieth embodiment, the action of the centrifugal force generated when the main and auxiliary gears 2117 and 2118 are rotated causes each weight member 1621 to be moved radially outwardly between the corresponding pair of opposed grooves 2119 and 2120, whereby the auxiliary gear 2118 is moved to the right as viewed in FIG. 35. The rightward movement of the auxiliary gear 2118 results in angular movement of the main and auxiliary gears 2117 and 2118 relative to each other by screw splines 2123 constituted by the paired inclined surfaces 2128, 2129 which form the second means, to thereby angularly move the auxilairy gear 2118 into an angularly offset position with respect to the gear 2117.

FIG. 36 shows a twenty-first embodiment of the invention which is different from the fifteenth embodiment described with reference to FIGS. 28 through 30 in the structure of the second means and the disposed location of the weight members. In FIG. 36, like reference numerals are used to designate like or similar parts and components to those of the fifteenth embodiment, and the description of such like parts and components is therefore omitted.

Specifically, second means 2223 of the twenty-first embodiment is comprised of spiral splines 2223c formed on the outer peripheral surface of the hub 1617a of the main gear 17 and spline grooves 2223d formed in the inner peripheral surface of the auxiliary gear 18 and slidably engaging the splines 2223c, similarly to the sixteenth embodiment described with reference to FIG. 31. A retainer plate 2224 is mounted on the outer peripheral surface of the hub 1617a of the main gear 17 adjacent an axial end thereof for rotation with the main gear 17 and in opposed, but spaced relation to the axial end face of the auxiliary gear 18. The retainer plate 2224 is in th form of an annular disc and has a central bore fitted on the outer peripheral surface of the hub 1617a of the main gear 17 in a manner such that the retainer plate 2224 is removable from the hub 1617a, and rotatable together with the main gear 17. To be concrete, the retainer plate 2224 is fitted on the hub 1617a of the main gear 17 by spline-engaging means, not shown, for axial movement relative to the hub 1617a and against circumferential movement relative thereto. Also, the retainer plate 2224 is held in place by a snap ring 2210 which is removably fitted on an annular groove 2212 formed in the outer peripheral surface of the hub 1617a, via a washer 2211 fitted on the hub 1617a and interposed between the retainer plate and the snap ring 2210 so that the retainer plate 2224 is prohibited from being axially dislocated away from the main gear 17 beyond a predetermined axial location. The retainer plate 2224 can be easily removed from the main gear 17 merely by removing the snap ring 2210 and then the washer 2211 from the hub 1617a.

A plurality of (three, for example) radially extending, engaging grooves 2225 are formed in an axial end face of the auxiliary gear 18 opposite to the retainer plate 2224 in circumferentially equidistantly spaced relation to each other. Radially extending engaging grooves 2226 are formed in an axial end face of the retainer plate 2224 opposite to the auxiliary gear 18 so as to correspond to the respective engaging grooves 2225. Each of the grooves 2225 and corresponding one of the grooves 2226 opposed to each other, and each of the grooves 2226 in the retainer plate 2224 has a bottom formed by an inclined surface 2226 which is progressively inclined toward the auxiliary gear 18 as the bottom approaches the outer periphery of the retainer plate 2224. Each of weight members 1621 such as, for example, steel balls or the like is slidably interposed between corresponding one of pairs of opposed engaging grooves 2225 and 2226, and is biased radially outwardly toward the outer periphery of the retainer plate 2224 by a coil spring 1622. The engaging grooves 2225 and 2226, weight members 1621 and springs 1622 form the second means for axially moving the auxiliary gear 18 in response to the centrifugal force due to rotation of the main and auxiliary gears 17 and 18.

Thus, the action of the centrifugal force generated when the main and auxiliary gears 17 and 18 causes each weight member 1621 to be moved radially outwardly between the corresponding pair of opposed grooves 2225 and 2226, whereby the auxiliary gear 18 is moved to the left as viewed in FIG. 36. The leftward movement of the auxiliary gear 18 results in angular movement of the main and auxiliary gears 17 and 18 relative to each other by the engagement between the splines 2223c and the spline grooves 2223d. This causes the auxiliary gear 18 to be angularly moved and made angularly offset with respect to the gear 17.

The steel balls and the like which are components of the second means for axially moving the auxiliary gear 18 by the centrifugal force are disposed between the auxiliary gear 18 and the retainer plate 2224 which is removable from the main gear 17. Therefore, it is possible to mount between the auxiliary gear 18 and the retainer plate 2224 such components as steel ball of any suitable sizes without being restricted in particular by tooth thickness of the main and auxiliary gears 17 and 18, and this makes it possible to obtain sufficient centrifugal force.

Furthermore, the retainer plate 2224 can be mounted on the hub 1617a of the main gear 17 after the assembling of the main and auxiliary gears 17 and 18 with each other and, therefore, the assembling of such components is facilitated. In particular, it is advantageous that the springs 1622 can be mounted after the assembling of the main and auxiliary gears 17 and 18 with mating gears, because if the springs are disposed in and between the gears 17 and 18, the latter are often angularly dislocated relative to each other, making it often troublesome to bring the gears 17 and 18 into mesh with the intermediate idle gears 8 and 8' which are the mating gears.

The fifteenth to twenty-first embodiments have been described with reference to FIGS. 28 to 36 as having the first means comprising weight members each of which is formed by a single member in the form of a roller having a circular cross-section, a sphere or a block. However, the present invention should not be limited to these particular forms, and a multiplicity of steel balls in the form of particles utilized for shotblast or the like may be interposed between each pair of opposed grooves.

Figure 37:
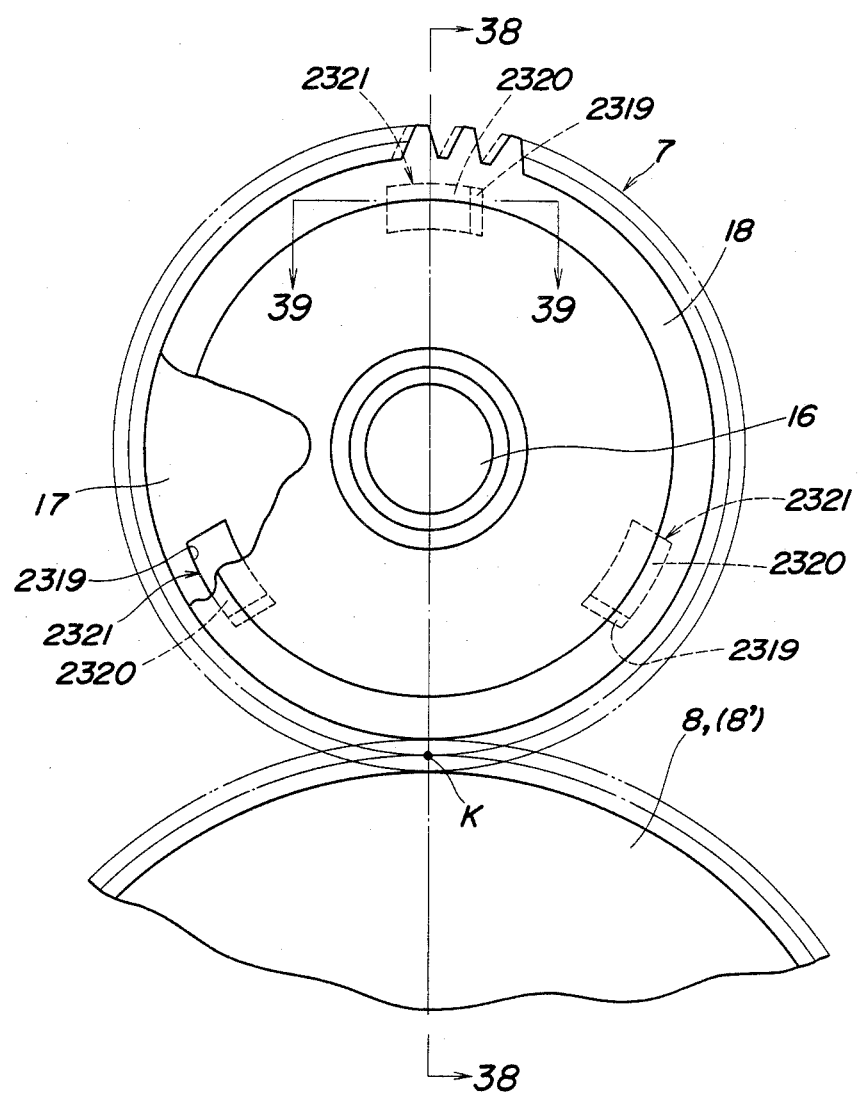
FIG. 37 is a view similar to FIG. 2, but showing a twenty-second embodiment of the invention.
Figure 38:
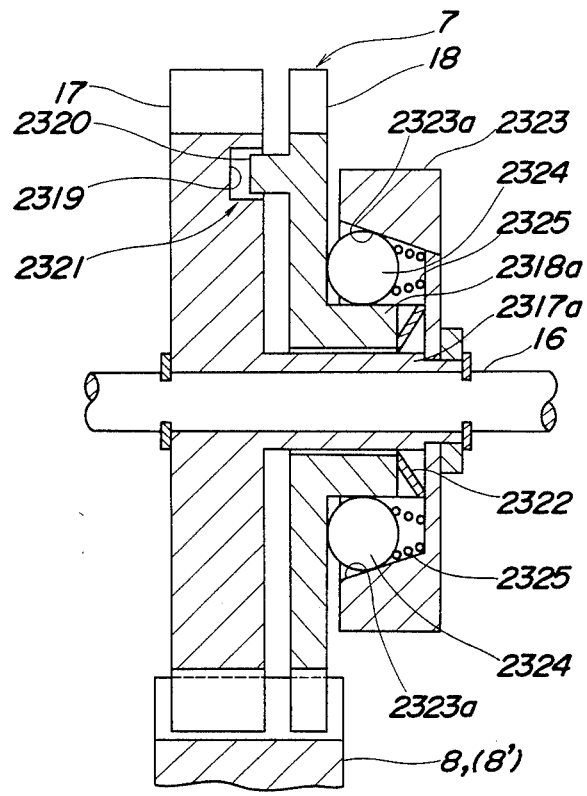
FIG. 38 is a cross-sectional view taken along the line 38—38 in FIG. 37.
Figure 39:
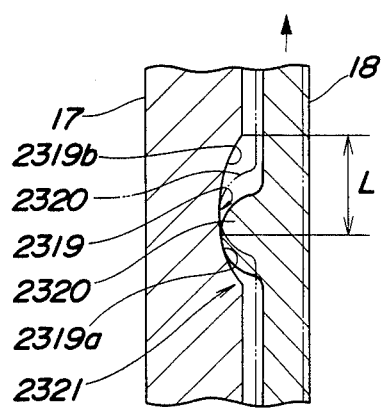
FIG. 39 is a cross-sectional view taken along the line 39—39 in FIG. 37.

FIGS. 37 through 39 show a twenty-second embodiment of the invention which is different from the sixteenth to twenty-first embodiments described with reference to FIGS. 31 to 36 in that the twenty-second embodiment further comprises third means for preventing axial movement of the auxiliary gear against the urging force of the second means described with reference to the sixteenth to twenty-first embodiments. In FIGS. 37 through 39, like reference characters are used to designate like or similar parts and components to those of the sixteenth to twenty-first embodiments, and the description of such like parts and components is therefore omitted.

Specifically, a plurality of (three, for example) engaging recesses 2319 are formed in an axial end face of the main gear 17 opposite to the auxiliary gear 18 in circumferentially equidistantly spaced relation to each other. The engaging recesses 2319 are identical in configuration and dimensions to each other, and each recess 2319 has an arcuate bottom which has at circumferential opposite ends thereof inclined surfaces 2319a and 2319b, as shown in FIG. 39. Engaging projections 2320 are formed on an axial end face of the auxiliary gear 18 opposite to the main gear 17 in circumferentially equidistantly spaced relation to each other and corresponding in number and angular position respectively to the engaging recesses 2319 in the main gear 17. The engaging projections 2320 are idential in configuration and dimensions to each other and have a generally semi-circular shape as shown in FIG. 39. The engaging projections 2320 engage the respective engaging recesses 2319, and the engaging projections 2320 and the engaging recesses 2319 form converting means 2321 for converting axial movement of the auxiliary gear 18 to circumferential movement thereof. The auxiliary gear 18 is axially biased toward the main gear 17 by a Belleville spring 2322 which forms biasing means. The a Belleville spring 2322 is interposed between a retainer member 2323 disposed on a side of the auxiliary gear 18 remote from the main gear 17 and an axial end face of a hub 2218a of the auxiliary gear 18. The retainer member 2323 is generally in the form of a dish and is fitted on an outer periphery of a hub 2317a of the main gear 17 against axial movement and for rotation with the main gear 17 in a manner such that an axial end face of the retainer member 2323, to which a recess formed therein opens, faces toward the auxiliary gear 18. A peripheral wall surface 2323a of the recess in the retainer member 2323 is inclined so as to diverge progressively from the bottom of the recess toward the opening thereof, i.e., toward the auxiliary gear 18. A plurality of balls 2324 which form locking means are interposed between the peripheral wall surface 2323a of the recess in the retainer member 2323 and an outer peripheral surface of the hub 2318a of the auxiliary gear 18 in circumferentially equidistantly spaced relation to each other. The balls 2324 serve to prevent the auxiliary gear 18 from being axially moved against the Belleville spring 2322 and are biased toward the opening of the recess in the retainer member 2323, i.e., toward the auxiliary gear 18 by means of respective coil springs 2325.

Here, similarly to the first embodiment described with reference to FIGS. 2 and 3, a case will be considered where a backlash is present at the meshing point K between the main gear 17 and the intermediate idle gear 8, 8'. The gears 17 and 18 are oscillated between a pair of adjacent gear teeth of the intermediate idle gear 8 due to fluctuation in torque during rotation of the gears 17 and 18. Upon the fluctuation in torque, the auxiliary gear 18 is axially moved toward the main gear 17 by the biasing force of the Belleville spring 2322 in such a direction as to decrease the distance L (FIG. 39) between one circumferential end of each of the engaging recesses 2319 and a vertex of the corresponding engaging projection 2320. The axial movement of the auxiliary gear 18 causes the engaging projection 2320 to be brought into engagement with the inclined surface 2319a of the corresponding engaging recess 2319 and to be guided therealong. Thus, the axial movement of the auxiliary gear 18 is converted to circumferential movement thereof as indicated by an arrow in FIG. 39, and the auxiliary gear 18 is angularly moved toward a position indicated by the two-dot-and-dash lines in FIG. 39, i.e., in the clockwise direction as viewed in FIG. 37. In this manner, the angularly moving force is applied to the auxiliary gear 18. The angular movement of the auxiliary gear 18 stops when the forces applied to the gear 18 are balanced with each other at a position where backlash is minimized, and the auxiliary gear 18 is brought into a stationary condition.

Once the auxiliary gear 18 is axially moved toward the main gear 17, i.e., in such a direction as to minimize the backlash, the auxiliary gear 18 is locked and retained by the balls 2324 of the locking means so as not to be returned to, thereby ensure the backlash reducing action. This makes it possible to reduce the meshing noize due to the backlash, over the entire speed range from a low rotational speed to a high rotational speed.

The above-described converting means 2321, biasing means 2322 and locking means 2324 should not be limited to those of the above-described twenty-second embodiment, but may be suitably modified according to necessity.

Additionally, the backlash reducer in accordance with the first to twenty-second embodiment of the invention has been described above as being applied to a valve-operating-camshaft driving mechanism for an internal combustion engine. However, the invention should not be limited to such particular application. The invention is applicable to any type of gear transmission system comprising a driving gear and a driven gear in mesh therewith.

What is claimed is:

1. A backlash reducer for a gear transmission system including a driving gear, a driven gear in mesh therewith, and at least one rotary shaft having mounted thereon one of said driving and driven gears, said backlash reducer comprising:
    said one gear mounted on said rotary shaft being constituted by a main gear mounted on said rotary shaft for rotation therewith and an auxiliary rear mounted on said rotary shaft in coaxial relation to said main gear and for rotation relative to said main gear;
    at least one pair of opposed clamping surfaces, one of said clamping surfaces being provided on said main gear and the other clamping surface being provided on said auxiliary gear;
    at least one weight member movably clamped between corresponding ones of said one and other clamping surfaces; and
    said one and other clamping surfaces being inclined with respect to a plane including an axis of said rotary shaft,
    wherein a centrifugal force due to rotation of said main and auxiliary gears causes said at least one weight member to angularly move said main and auxiliary gears relative to each other through said corresponding ones of said one and other clamping surfaces.

2. A backlash reducer as defined in claim 1, wherein said one and other clamping surfaces are inclined with respect to said plane at respective angles different from each other.

3. A backlash reducer as defined in claim 1, wherein said at least one weight member comprises a first retainer member having a sliding contact surface in sliding contact with said one clamping surface, a second retainer member having a sliding contact surface in sliding contact with said other clamping surface, a recess formed in a surface of said first retainer member opposite to said sliding contact surface thereof, a recess formed in a surface of said second retainer member opposite to said sliding contact surface thereof in opposed relation to said recess in said first retainer member, and a slide member disposed between said opposed recesses and having an outer peripheral surface in sliding contact with said opposed recesses.

4. A backlash reducer as defined in claim 1, wherein said weight member comprises a pipe which is formed of a resilient metallic material and which is formed with a slit in peripheral wall of said pipe.

5. A backlash reducer as defined in claim 1, wherein said main gear has a side surface opposite to said auxiliary gear formed therein with at least one groove, said one clamping surface being one circumferential end surface of each of said at least one groove, said auxiliary gear having a side surface opposite to said main gear formed therein with at least one projection extending into each of said at least one groove, said other clamping surface being one circumferential end surface of each of said at least one projection.

6. A backlash reducer as defined in claim 5, wherein said main gear has a side surface opposite to said auxiliary gear formed therein with at least one groove, said one clamping surface being one circumferential end surface of each of said at least one groove, said auxiliary gear having a side surface opposite to said main gear formed therein with at least one projection extending into each of said at least one groove, said other clamping surface being one circumferential end surface of each of said at least one projection, and said at least one groove of said main gear has a circumferentially extending, radially outer side surface, said second means comprising at least one coil spring each of which is disposed within a bore located at one end of said circumferentially extending, radially outer side surface, said at least one coil spring biasing each of said at least one weight member radially inwardly of said main gear.

7. A backlash reducer as defined in claim 5, wherein said main gear has a side surface opposite to said auxiliary gear formed therein with at least one groove, said one clamping surface being one circumferential end surface of each of said at least one groove, said auxiliary gear having a side surface opposite to said main gear formed therein with at least one projection extending into each of said at least one groove, said other clamping surface being one circumferential end surface of each of said at least one projection, and said at least one projection of said auxiliary gear has a V-shaped groove provided centrally in one circumferential end surface thereof opposite to said other clamping surface thereof, each of said at least one groove of said main gear having a bore formed generally centrally in one circumferential end wall surface thereof opposite to said one clamping surface of each of said at least one groove of said main gear, said second means comprising at least one coil spring interposed between said V-shaped groove and a bottom of said bore, at least one coil spring biasing a corresponding one of said at least one weight member and a corresponding one of said at least one projection.

8. A backlash reducer as defined in claim 5, wherein said main gear has a side surface opposite to said auxiliary gear formed therein with at least one groove, said one clamping surface being one circumferential end surface of each of said at least one groove, said auxiliary gear having a side surface opposite to said main gear formed therein with at least one projection extending into each of said at least one groove, said other clamping surface being one circumferential end surface of each of said at least one projection, and said at least one groove of said main gear has a circumferentially extending, radially inner side surface, said second means comprising at least one magnetic member provided within a bore located at one end of said circumferentially extending, radially inner side surface, said at least one magnetic member magnetically attracting a corresponding one of said at least one weight member radially inwardly of said main gear.

9. In a backlash reducer for a gear transmission system including a driving gear, a driven gear in mesh therewith, and at least one rotary shaft having mounted thereon one of said driving and driven gears, said one gear mounted on said rotary shaft being constituted by a main gear mounted on said rotary shaft for rotation therewith and an auxiliary gear mounted on said rotary shaft in coaxial relation to said main gear and for rotation relative to said main gear, said backlash reducer comprising:

first means disposed between said main and auxiliary gears and operable in response to a centrifugal force due to rotation of said rotary shaft for increasing a relative rotational angle between said main and auxiliary gears to reduce a backlash between said driving and driven gears, the improvement comprising:

second means for restraining the increase of said relative rotational angle between said main and auxiliary gears responsive to said centrifugal force, thereby restraining the backlash reducing action by said first means.

10. A backlash reducer as defined in claim 9, wherein said first means comprises:

at least one pair of opposed clamping surfaces, one of said clamping surfaces being provided on said main gear and the other clamping surface being provided on said auxiliary gear;

at least one weight member movably clamped between corresponding ones of said one and other clamping surfaces; and said one and other clamping surfaces being inclined with respect to a plane including an axis of said rotary shaft, wherein a centrifugal force due to rotation of said main and auxiliary gear causes said at least one weight member to angularly move said main and auxiliary gears relative to each other through said corresponding one of said one and other clamping surfaces.

11. A backlash reducer as defined in claim 10, wherein said one and other clamping surfaces are inclined with respect to said plane at respective angles different from each other.

* * * * *

UNITED STATES PATENT AND TRADEMARK OFFICE
CERTIFICATE OF CORRECTION

PATENT NO. : 4,739,670
DATED       : April 26, 1988
INVENTOR(S) : Takao Tomita, Noriaki Kawai and Katsura Shinoda It is certified that error appears in the above-identified patent and that said Letters Patent is hereby corrected as shown below:

Claim 1, Column 25, line 47:  change "rear" to "gear";

Claim 6, Column 26, line 31:  change "5" to "10";

Claim 7, Column 26, line 48:  change "5" to "10";

Claim 8, Column 27, line  3:  change "5" to "10".

Signed and Sealed this

Eighteenth Day of October, 1988

Attest:

DONALD J. QUIGG

Attesting Officer

Commissioner of Patents and Trademarks